US012713052B2

(12) United States Patent
Sánchez De La Fuente et al.

(10) Patent No.: US 12,713,052 B2
(45) **Date of Patent: *Aug. 18, 2026**

(54) ENCODER AND DECODER, ENCODING METHOD AND DECODING METHOD FOR DRIFT-FREE PADDING AND HASHING OF INDEPENDENT CODING REGIONS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft Zur Förderung Der Angewandten Forschung E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,983

(22) Filed: Aug. 15, 2024

(65) Prior Publication Data

US 2024/0406431 A1 Dec. 5, 2024

Related U.S. Application Data

(63) Continuation of application No. 17/455,845, filed on Nov. 19, 2021, now Pat. No. 12,096,016, which is a (Continued)

(30) Foreign Application Priority Data

May 22, 2019 (EP) .................................... 19176033

(51) Int. Cl.
*H04N 19/46* (2014.01)
*H04N 19/107* (2014.01)
(Continued)

(52) U.S. Cl.
CPC ........... *H04N 19/46* (2014.11); *H04N 19/107* (2014.11); *H04N 19/172* (2014.11); *H04N 19/186* (2014.11); *H04N 19/88* (2014.11)

(58) Field of Classification Search
CPC .. H04N 19/105; H04N 19/107; H04N 19/117; H04N 19/167; H04N 19/172;
(Continued)

(56) References Cited

U.S. PATENT DOCUMENTS

| | | | |
|---|---|---|---|
| 8,965,137 | B2 | 2/2015 | Thomas et al. |
| 2013/0101016 | A1 | 4/2013 | Chong et al. |

(Continued)

OTHER PUBLICATIONS

Benjamin Bross et al., "Versatile Video Coding (Draft 5)", JVET-N1001-v3, Joint Video Experts Team (JVET) of ITU-T SG 16 WP 3 and ISO/IEC JTC 1/SC 29/WG 11, 14th Meeting: Geneva, CH, Mar. 19-27, 2019.

(Continued)

*Primary Examiner* — Shahan Ur Rahaman
(74) *Attorney, Agent, or Firm* — Sage Patent Group

(57) ABSTRACT

A video encoder according to embodiments is configured for encoding a plurality of pictures of a video by generating an encoded video signal, wherein each of the plurality of pictures includes original picture data. The video encoder includes a data encoder configured for generating the encoded video signal including encoded picture data, wherein the data encoder is configured to encode the plurality of pictures of the video into the encoded picture data. Moreover, the video encoder includes an output interface configured for outputting the encoded picture data of each of (Continued)

the plurality of pictures. Furthermore, a video decoders, systems, methods for encoding and decoding, computer programs and encoded video signals according to embodiments are provided.

12 Claims, 12 Drawing Sheets

Related U.S. Application Data continuation of application No. PCT/EP2020/064116, filed on May 20, 2020.

(51) Int. Cl.

| | |
|---|---|
| ***H04N 19/172*** | (2014.01) |
| ***H04N 19/186*** | (2014.01) |
| ***H04N 19/88*** | (2014.01) |

(58) Field of Classification Search

CPC .. H04N 19/174; H04N 19/182; H04N 19/186; H04N 19/46; H04N 19/503; H04N 19/82; H04N 19/88

See application file for complete search history.

(56) References Cited

U.S. PATENT DOCUMENTS

| | | | | |
|---|---|---|---|---|
| 2014/0192896 | A1 | 7/2014 | Wang | |
| 2015/0245059 | A1 | 8/2015 | Terada et al. | |
| 2015/0261884 | A1 | 9/2015 | Pang | |
| 2015/0271529 | A1* | 9/2015 | Wang | H04N 19/70 375/240.26 |
| 2016/0277733 | A1 | 9/2016 | Li | |
| 2017/0188051 | A1 | 6/2017 | Amer | |
| 2018/0270287 | A1* | 9/2018 | Ouedraogo | H04N 19/103 |
| 2019/0379912 | A1 | 12/2019 | Su | |
| 2022/0078461 | A1 | 3/2022 | Sanchez De La Fuente | |

OTHER PUBLICATIONS

ISO/IEC, ITU-T. Series H: Audiovisual and Multimedia Systems Infrastructure of audiovisual services—Coding of moving video, High efficiency video coding. ITU-T Recommendation H.265 I ISO/IEC 23008 10 (HEVC), edition 1, 2013.

ISO/IEC, ITU-T. Series H: Audiovisual and Multimedia Systems Infrastructure of audiovisual services—Coding of moving video, High efficiency video coding. ITU-T Recommendation H.265 I ISO/IEC 23008 10 /HEVC), edition 2, 2014.

Aminlou A et al, "CE12-related: MCTS improvement by modifying prediction block", No. m47065, Mar. 15, 2019 (Mar. 15, 2019), 126. MPEG Meeting; Mar. 25, 2019-Mar. 29, 2019; Geneva; (Motion Picture Expert Group or ISO/IEC JTC1/SC29/WG11 ), Retrieved from the Internet: URL:http://phenix.intevry.fr/mpeg/doc_end_user/documents/126_Geneva/wg11 /m47065-JVET-N0403-v2-JVET-N0403-v2.zipJVET-N0403-v2/JVET-N0403-v2.docx, XP030210547.

Y-K Wang et al, "AHG 4: Dependency and loop filtering control over tile boundaries", 98. MPEG Meeting; Nov. 28, 2011-Dec. 2, 2011; Geneva; (Motion Picture Expert Group or ISO/IECJTC1/SC29/WG11 ),,No. m21879, Nov. 23, 2011 (Nov. 23, 2011), XP030050442.

Jang (LGE) H et al, "Non-CE5: Long-tap deblocking filter on vertical tile boundary", No. JVET-O0578, Jul. 7, 2019 (Jul. 7, 2019), 15. JVET Meeting; Jul. 3, 2019-Jul. 12, 2019; Gothenburg; (The Joint Video Exploration Team of ISO/IEC JTC1/SC29/WG11 and ITU-T SG.16) Retrieved from the Internet: URL :http://phenix.int-evry. fr/jvet/doc end user/docu ments/15Gothenburg/wg11/JVET-O0578-v3.zipJVET-O0578.ootx, XP030219958.

Skupin R et al, "AHG12: On filtering of independently coded region", No. JVET-00494, Jul. 9, 2019 (Jul. 9, 2019), 15. JVET Meeting; Jul. 3, 2019-Jul. 12, 2019; Gothenburg; (The Joint Video Exploration Team of ISO/IEC JTC1/SC29/WG11 and ITU-T SG.16 ), Retrieved from the Internet: URL:http://phenix.intevry.fr/jveVdoc_end_user/documents/15_Gothenburg/wg11/JVET-00494-v4.zip JVET-O0494-v3.docx, XP030219731.

ITU-T H.264 (Apr. 2017) ,Series H: Audiovisual and Multimedia Systems Infrastructure of audiovisual services—Coding of moving, video Advanced video coding for generic audiovisual services.

ISO/IEC JTC 1/SC 29, Date: Dec. 11, 2017, ISO/IEC FDIS 23090-12:201x (E), ISO/IEC JTC 1/SC 29/WG 11, Information technology—Coded representation of immersive media (MPEG-I)—Part 2: Omnidirectional media format.

Taquet, "AHG7 Signaling of decoded motion constrained tile set hash", Joint Collaborative Team on Video Coding (JCT-VC), JCTCV-AA0028, Mar. 31-Apr. 7, 2017, Hobart, AU, 6 pages.

* cited by examiner

ENCODER AND DECODER, ENCODING METHOD AND DECODING METHOD FOR DRIFT-FREE PADDING AND HASHING OF INDEPENDENT CODING REGIONS

CROSS-REFERENCES TO RELATED APPLICATIONS

This application is a continuation of U.S. patent application Ser. No. 17/455,845, filed Nov. 19, 2021, pending, which is a continuation of PCT International Application No. PCT/EP2020/064116, filed May 20, 2020, which claims priority of European Patent Application No. 19176033.9, filed May 22, 2019, the entire contents of each of which are hereby incorporated by reference in this application.

The present invention relates to video encoding and video decoding and, in particular, to an encoder and a decoder, to an encoding method and to a decoding method for drift-free padding and/or hashing of independent coding regions.

BACKGROUND OF THE INVENTION

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following, an introduction to VCL partitioning according to the state-of-the-art is described (VCL=video coding layer).

Typically, in video coding, a coding process of picture samples involves smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

SUMMARY

According to an embodiment, a video decoder for decoding an encoded video signal including encoded picture data to reconstruct a plurality of pictures of a video may have: an input interface configured for receiving the encoded video signal, and a data decoder configured for reconstructing the plurality of pictures of the video by decoding the encoded picture data, wherein the data decoder is configured to analyse hash information encoded within the encoded video signal, wherein the hash information depends on a current portion of a current picture of the plurality of pictures.

According to another embodiment, a video encoder for encoding a plurality of pictures of a video by generating an encoded video signal, wherein each of the plurality of pictures includes original picture data, may have: a data encoder configured for generating the encoded video signal including encoded picture data, wherein the data encoder is configured to encode the plurality of pictures of the video into the encoded picture data, and an output interface configured for outputting the encoded picture data of each of the plurality of pictures, wherein the data encoder is configured to encode hash information within the encoded video signal, wherein the data encoder is configured to generate the hash information depending on a current portion of a current picture of the plurality of pictures.

According to yet another embodiment, a method for decoding an encoded video signal including encoded picture data to reconstruct a plurality of pictures of a video may have the steps of: receiving the encoded video signal, and reconstructing the plurality of pictures of the video by decoding the encoded picture data, wherein the method includes analysing hash information encoded within the encoded video signal, wherein the hash information depends on a current portion of a current picture of the plurality of pictures.

According to still another embodiment, a method for encoding a plurality of pictures of a video by generating an encoded video signal, wherein each of the plurality of pictures includes original picture data, may have the steps of: generating the encoded video signal including encoded picture data, wherein generating the encoded video signal includes encoding the plurality of pictures of the video into the encoded picture data, and outputting the encoded picture data of each of the plurality of pictures, wherein the method includes encoding hash information within the encoded video signal, wherein the method includes generating the hash information depending on a current portion of a current picture of the plurality of pictures.

According to another embodiment, a non-transitory digital storage medium may have a computer program stored thereon to perform the inventive methods, when said computer program is run by a computer.

Another embodiment may have an encoded video signal encoding a plurality of pictures including a plurality of tiles, wherein each of said plurality of tiles includes a plurality of samples, wherein the encoded video signal includes encoded picture data encoding the plurality of pictures, wherein the encoded video signal includes an encoding of the plurality of pictures, wherein the encoded video signal includes an encoding of hash information, wherein the hash information depends on a current portion of a current picture of the plurality of pictures.

According to another embodiment, a system may have:

the video encoder for encoding a plurality of pictures of a video by generating an encoded video signal, wherein each of the plurality of pictures includes original picture data, wherein the video encoder includes:

a data encoder configured for generating the encoded video signal including encoded picture data, wherein the data encoder is configured to encode the plurality of pictures of the video into the encoded picture data, and an output interface configured for outputting the encoded picture data of each of the plurality of pictures, wherein the data encoder is configured to encode hash information within the encoded video signal, wherein the data encoder is configured to generate the hash information depending on a current portion of a current picture of the plurality of pictures, the inventive video decoder, wherein the video encoder is configured to generate the encoded video signal, and wherein the video decoder is configured to decode the encoded video signal to reconstruct the picture of the video.

A video decoder for decoding an encoded video signal comprising encoded picture data to reconstruct a plurality of pictures of a video according to an embodiment is provided. The video decoder comprises an input interface configured for receiving the encoded video signal, and a data decoder configured for reconstructing the plurality of pictures of the video by decoding the encoded picture data. Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, the data decoder is configured for filtering across a boundary between the first tile and the second tile to obtain a first filtered tile, wherein the first tile and the second tile have been independently encoded with respect to each other. The data decoder is configured to decode a current tile of the plurality of tiles of a second picture of the plurality of pictures depending on a reference block of said first filtered tile of said first picture, wherein said reference block comprises a first group of samples of said first filtered tile, and wherein said reference block does not comprise a second group of samples of said first filtered tile, wherein none of said first group of samples has been affected by said filtering across said boundary between the first tile and the second tile, and wherein one or more of said second group of samples have been affected by said filtering across said boundary between the first tile and the second tile.

Moreover, a video encoder for encoding a plurality of pictures of a video by generating an encoded video signal according to an embodiment is provided. Each of the plurality of pictures comprises original picture data. The video encoder comprises a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures. Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, a boundary exists between the first tile and the second tile. The data encoder is configured to independently encode the first tile and the second tile with respect to each other. Moreover, the data encoder is configured to encode a current tile of the plurality of tiles of a second picture of the plurality of pictures depending on a reference block of said first tile of said first picture, wherein a filter defines a filtering across said boundary between the first tile and the second tile, wherein said reference block comprises a first group of samples of said first tile, and wherein said reference block does not comprise a second group of samples of said first tile, wherein none of said first group of samples would be affected by said filtering using said filter, and wherein one or more of said second group of samples would be affected by said filtering using said filter.

Furthermore, a method for decoding an encoded video signal comprising encoded picture data to reconstruct a plurality of pictures of a video according to an embodiment is provided. The method for decoding comprises:

Receiving the encoded video signal. And:

Reconstructing the plurality of pictures of the video by decoding the encoded picture data.

Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, the method comprises filtering across a boundary between the first tile and the second tile to obtain a first filtered tile, wherein the first tile and the second tile have been independently encoded with respect to each other. The method comprises decoding a current tile of the plurality of tiles of a second picture of the plurality of pictures depending on a reference block of said first filtered tile of said first picture, wherein said reference block comprises a first group of samples of said first filtered tile, and wherein said reference block does not comprise a second group of samples of said first filtered tile, wherein none of said first group of samples has been affected by said filtering across said boundary between the first tile and the second tile, and wherein one or more of said second group of samples have been affected by said filtering across said boundary between the first tile and the second tile.

Moreover, a method for encoding a plurality of pictures of a video by generating an encoded video signal according to an embodiment is provided. Each of the plurality of pictures comprises original picture data. The method comprises:

Generating the encoded video signal comprising encoded picture data, wherein generating the encoded video signal comprises encoding the plurality of pictures of the video into the encoded picture data, and Outputting the encoded picture data of each of the plurality of pictures, Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, a boundary exists between the first tile and the second tile. The method comprises independently encoding the first tile and the second tile with respect to each other. Moreover, the method comprises encoding a current tile of the plurality of tiles of a second picture of the plurality of pictures depending on a reference block of said first tile of said first picture, wherein a filter defines a filtering across said boundary between the first tile and the second tile, wherein said reference block comprises a first group of samples of said first tile, and wherein said reference block does not comprise a second group of samples of said first tile, wherein none of said first group of samples would be affected by said filtering using said filter, and wherein one or more of said second group of samples would be affected by said filtering using said filter.

Furthermore, a computer program for implementing one of the above-described methods of claim when being executed on a computer or signal processor is provided.

Moreover, an encoded video signal encoding a plurality of pictures comprising a plurality of tiles according to an embodiment is provided. Each of said plurality of tiles comprises a plurality of samples, wherein the encoded video signal comprises encoded picture data encoding the plurality of pictures. The encoded video signal comprises an encoding of the plurality of pictures. For a first tile and a second tile of two neighboured tiles of the plurality of tiles of a first picture of the plurality of pictures, a boundary exists between the first tile and the second tile. The first tile and the second tile are independently encoded within the encoded video signal with respect to each other. A current tile of the plurality of tiles of a second picture of the plurality of pictures is encoded depending on a reference block of said first tile of said first picture, wherein a filter defines a filtering across said boundary between the first tile and the second tile, wherein said reference block comprises a first group of samples of said first tile, and wherein said reference block does not comprise a second group of samples of said first tile, wherein none of said first group of samples would be affected by said filtering using said filter, and wherein one or more of said second group of samples would be affected by said filtering using said filter.

In an embodiment, the encoded video signal may, e.g., comprise an indication of an encoding mode that indicates that no samples of said reference block being used for decoding said current tile shall be affected by said filtering across said boundary between the first tile and the second tile.

Furthermore, a system comprising the above-described video encoder and the above-described video decoder is provided. The video encoder is configured to generate the encoded video signal. The video decoder is configured to decode the encoded video signal to reconstruct the picture of the video.

Moreover, a video decoder for decoding an encoded video signal comprising encoded picture data to reconstruct a plurality of pictures of a video according to an embodiment is provided. The video decoder comprises an input interface configured for receiving the encoded video signal, and a data decoder configured for reconstructing the plurality of pictures of the video by decoding the encoded picture data. Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a picture of the plurality of pictures, a boundary between the first tile and the second tile exists. The first tile and the second tile have been independently encoded with respect to each other. The data decoder is configured to filter the first tile using a filter or a filter kernel, wherein the data decoder is configured to modify a reach of said filter or of said filter kernel depending on a distance between a block to be filtered by said filter or said filter kernel of the first tile and said boundary between said first tile and said second tile, said block being one of the plurality of blocks of the first tile.

Furthermore, a video encoder for encoding a plurality of pictures of a video by generating an encoded video signal according to an embodiment is provided. Each of the plurality of pictures comprises original picture data. The video encoder comprises a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures. Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a first picture of the plurality of pictures, a boundary exists between the first tile and the second tile. The data encoder is configured to independently encode the first tile and the second tile with respect to each other. Moreover, the data encoder is configured to filter the first tile using a filter or a filter kernel, wherein the data encoder is configured to modify a reach of said filter or of said filter kernel depending on a distance between a block to be filtered by said filter or said filter kernel and a boundary between said first tile and said second tile, said block being one of the plurality of blocks of the first tile.

Moreover, a method for decoding an encoded video signal comprising encoded picture data to reconstruct a plurality of pictures of a video according to an embodiment is provided. The method for decoding comprises:

Receiving the encoded video signal, and

Reconstructing the plurality of pictures of the video by decoding the encoded picture data.

Each of the plurality of pictures comprises a plurality of tiles, wherein each of said plurality of tiles comprises a plurality of blocks, wherein each of the plurality of blocks comprises a plurality of samples.

For a first tile and a second tile of two neighboured tiles of the plurality of tiles of a picture of the plurality of pictures, a boundary between the first tile and the second tile exists. The first tile and the second tile have been independently encoded with respect to each other. The method comprises filtering the first tile using a filter or a filter kernel, wherein the method comprises modifying a reach of said filter or of said filter kernel depending on a distance between a block to be filtered by said filter or said filter kernel of the first tile and said boundary between said first tile and said second tile, said block being one of the plurality of blocks of the first tile.

Furthermore, a method for encoding a plurality of pictures of a video by generating an encoded video signal, wherein each of the plurality of pictures comprises original picture data, wherein the method comprises:

Generating the encoded video signal comprising encoded picture data, wherein generating the encoded video signal comprises encoding the plurality of pictures of the video into the encoded picture data. And:

Outputting the encoded picture data of each of the plurality of pictures.

Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a first picture of the plurality of pictures, a boundary exists between the first tile and the second tile. The method comprises independently encoding the first tile and the second tile with respect to each other. Moreover, the method comprises filtering the first tile using a filter or a filter kernel, wherein the method comprises modifying a reach of said filter or of said filter kernel depending on a distance between a block to be filtered by said filter or said filter kernel and a boundary between said first tile and said second tile, said block being one of the plurality of blocks of the first tile.

Moreover, a computer program for implementing one of the above-described methods when being executed on a computer or signal processor according to an embodiment is provided.

Furthermore, an encoded video signal encoding a plurality of pictures comprising a plurality of tiles according to an embodiment is provided. Each of said plurality of tiles comprises a plurality of samples. The encoded video signal comprises encoded picture data encoding the plurality of pictures. Moreover, the encoded video signal comprises an encoding of the plurality of pictures. Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a first picture of the plurality of pictures, a boundary exists between the first tile and the second tile. The first tile and the second tile are independently encoded with respect to each other within the encoded video signal. The encoded video signal depends on a filtering of the first tile using a filter or a filter kernel, wherein during the filtering, a reach of said filter or of said filter kernel has been modified depending on a distance between a block to be filtered by said filter or said filter kernel and a boundary between said first tile and said second tile, said block being one of the plurality of blocks of the first tile.

Moreover, a system comprising the above-described video encoder and the above-described video decoder according to an embodiment is provided. The video encoder is configured to generate the encoded video signal. The video decoder is configured to decode the encoded video signal to reconstruct the picture of the video.

Furthermore, a video encoder for encoding a plurality of pictures of a video by generating an encoded video signal according to an embodiment is provided. Each of the plurality of pictures comprises original picture data. The video encoder comprises a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures. Each of the plurality of pictures comprises a plurality of tiles, wherein each of said plurality of tiles comprises a plurality of samples. The data encoder is configured for determine an independently encoded tile group comprising three or more tiles of the plurality of tiles of a reference picture of the plurality of pictures. Moreover, the data encoder is configured to encode the plurality of pictures depending on a reference block being located within the reference picture. Furthermore, the data encoder is configured to select a location for said reference block within the reference picture such that the reference block is not both partially located within three tiles of the three or more tiles of said independently encoded tile group and also partially located within another tile of the plurality of tiles of the reference picture that does not belong to said independently encoded tile group.

Moreover, a method for encoding a plurality of pictures of a video by generating an encoded video signal according to an embodiment is provided. Each of the plurality of pictures comprises original picture data. The method comprises:

Generating the encoded video signal comprising encoded picture data, wherein generating the encoded video signal comprises encoding the plurality of pictures of the video into the encoded picture data. And:

Outputting the encoded picture data of each of the plurality of pictures.

Each of the plurality of pictures comprises a plurality of tiles, wherein each of said plurality of tiles comprises a plurality of samples. The method comprises determining an independently encoded tile group comprising three or more tiles of the plurality of tiles of a reference picture of the plurality of pictures. Moreover, the method comprises encoding the plurality of pictures depending on a reference block being located within the reference picture. Furthermore, the method comprises selecting a location for said reference block within the reference picture such that the reference block is not both partially located within three tiles of the three or more tiles of said independently encoded tile group and also partially located within another tile of the plurality of tiles of the reference picture that does not belong to said independently encoded tile group.

Furthermore, a computer program for implementing one of the above-described methods when being executed on a computer or signal processor according to an embodiment is provided.

Moreover, an encoded video signal encoding a plurality of pictures comprising a plurality of tiles according to an embodiment is provided. Each of said plurality of tiles comprises a plurality of samples. The encoded video signal comprises encoded picture data encoding the plurality of pictures. The encoded video signal comprises an encoding of the plurality of pictures. Each of the plurality of pictures comprises a plurality of tiles, wherein each of said plurality of tiles comprises a plurality of samples. The encoded video signal comprises an independently encoded tile group comprising three or more tiles of the plurality of tiles of a reference picture of the plurality of pictures. The plurality of pictures are encoded within the video data stream depending on a reference block being located within the reference picture. The reference block is not both partially located within three tiles of the three or more tiles of said independently encoded tile group and also partially located within another tile of the plurality of tiles of the reference picture that does not belong to said independently encoded tile group.

Moreover, a system according to an embodiment comprising the above-described video encoder, and a video decoder for decoding an encoded video signal comprising encoded picture data to reconstruct a plurality of pictures of a video is provided. The video decoder comprises an input interface configured for receiving the encoded video signal, and a data decoder configured for reconstructing the plurality of pictures of the video by decoding the encoded picture data. The video encoder is configured to generate the encoded video signal. The video decoder is configured to decode the encoded video signal to reconstruct the picture of the video.

A video encoder for encoding a plurality of pictures of a video by generating an encoded video signal according to an embodiment is provided. Each of the plurality of pictures comprises original picture data. The video encoder comprises a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures. Each of the plurality of pictures comprises a plurality of tiles, wherein each of said plurality of tiles comprises a plurality of samples. The data encoder is configured for determine an independently encoded tile group comprising three or more tiles of the plurality of tiles of a reference picture of the plurality of pictures. Moreover, the data encoder is configured to encode the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Furthermore, the data encoder is configured to determine a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

Moreover, a video decoder for decoding an encoded video signal comprising encoded picture data to reconstruct a plurality of pictures of a video according to an embodiment is provided. The video decoder comprises an input interface configured for receiving the encoded video signal, and a data decoder configured for reconstructing the plurality of pictures of the video by decoding the encoded picture data. Each of the plurality of pictures comprises a plurality of tiles, wherein each of said plurality of tiles comprises a plurality of samples. The encoded video signal comprises an independently encoded tile group comprising three or more tiles of the plurality of tiles of a reference picture of the plurality of pictures. The data decoder is configured to decode the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Moreover, the data decoder is configured to determine a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

Moreover, a method for encoding a plurality of pictures of a video by generating an encoded video signal is provided. Each of the plurality of pictures comprises original picture data. The method comprises:

Generating the encoded video signal comprising encoded picture data, wherein generating the encoded video signal comprises encoding the plurality of pictures of the video into the encoded picture data. And:

Outputting the encoded picture data of each of the plurality of pictures.

Each of the plurality of pictures comprises a plurality of tiles, wherein each of said plurality of tiles comprises a plurality of samples. The method comprises determining an independently encoded tile group comprising three or more tiles of the plurality of tiles of a reference picture of the plurality of pictures. Moreover, the method comprises encoding the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Furthermore, the method comprises determining a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

Furthermore, a method for decoding an encoded video signal comprising encoded picture data to reconstruct a plurality of pictures of a video according to an embodiment is provided. The method for decoding comprises:

Receiving the encoded video signal. And:

Reconstructing the plurality of pictures of the video by decoding the encoded picture data.

Each of the plurality of pictures comprises a plurality of tiles, wherein each of said plurality of tiles comprises a plurality of samples. The encoded video signal comprises an independently encoded tile group comprising three or more tiles of the plurality of tiles of a reference picture of the plurality of pictures, The method comprises decoding the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Moreover, the method comprises determining a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

Furthermore, a computer program for implementing one of the above-described methods when being executed on a computer or signal processor according to an embodiment is provided.

Moreover, an encoded video signal encoding a plurality of pictures comprising a plurality of tiles, wherein each of said plurality of tiles comprises a plurality of samples according to an embodiment is provided. The encoded video signal comprises encoded picture data encoding the plurality of pictures. Moreover, the encoded video signal comprises an encoding of the plurality of pictures. Each of the plurality of pictures comprises a plurality of tiles, wherein each of said plurality of tiles comprises a plurality of samples. An independently encoded tile group comprising three or more tiles of the plurality of tiles of a reference picture of the plurality of pictures is independently encoded within the encoded video signal. The plurality of pictures is encoded within the encoded video signal depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. A plurality of reference samples for a portion of said reference block which is located within said another tile that does not belong to said independently encoded tile group is derivable one or more of the plurality of samples of a first one of said three tiles of said independently encoded tile group and from one or more samples of the plurality of samples of a second one of said three tiles of said independently encoded tile group.

Furthermore, a system comprising the above-described video encoder and the above-described video decoder according to an embodiment is provided. The video encoder is configured to generate the encoded video signal. The video decoder is configured to decode the encoded video signal to reconstruct the picture of the video.

Moreover, a video encoder for encoding a plurality of pictures of a video by generating an encoded video signal according to an embodiment is provided. Each of the plurality of pictures comprises original picture data. The video encoder comprises a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures. The data encoder is configured to encode hash information within the encoded video signal. Moreover, the data encoder is configured to generate the hash information depending on a current portion of a current picture of the plurality of pictures, but not depending on a succeeding portion of the current picture, wherein the current portion has a first location within the current picture, and the succeeding portion has a second location within the picture being different from the first location.

Furthermore, a video decoder for decoding an encoded video signal comprising encoded picture data to reconstruct a plurality of pictures of a video according to an embodiment is provided. The video decoder comprises an input interface configured for receiving the encoded video signal, and a data decoder configured for reconstructing the plurality of pictures of the video by decoding the encoded picture data. The data decoder is configured to analyse hash information encoded within the encoded video signal, wherein the hash information depends on a current portion of a current picture of the plurality of pictures, but does not depend on a succeeding portion of the current picture, wherein the current portion has a first location within the current picture, and the succeeding portion has a second location within the picture being different from the first location.

Moreover, a method for encoding a plurality of pictures of a video by generating an encoded video signal, wherein each of the plurality of pictures comprises original picture data. The method comprises:

- Generating the encoded video signal comprising encoded picture data, wherein generating the encoded video signal comprises encoding the plurality of pictures of the video into the encoded picture data. And:
- Outputting the encoded picture data of each of the plurality of pictures, The method comprises generating hash information depending on a current portion of a current picture of the plurality of pictures, but not depending on a succeeding portion of the current picture, wherein the current portion has a first location within the current picture, and the succeeding portion has a second location within the picture being different from the first location. Moreover, the method comprises encoding the hash information within the encoded video signal.

Furthermore, a method for decoding an encoded video signal comprising encoded picture data to reconstruct a plurality of pictures of a video according to an embodiment is provided. The method for decoding comprises:

- Receiving the encoded video signal. And:
- Reconstructing the plurality of pictures of the video by decoding the encoded picture data.

The method comprises analysing hash information encoded within the encoded video signal, wherein the hash information depends on a current portion of a current picture of the plurality of pictures, but does not depend on a succeeding portion of the current picture, wherein the current portion has a first location within the current picture, and the succeeding portion has a second location within the picture being different from the first location.

Moreover, a computer program for implementing the one of the above-described methods when being executed on a computer or signal processor according to an embodiment is provided.

Furthermore, an encoded video signal encoding a plurality of pictures comprising a plurality of tiles according to an embodiment is provided. Each of said plurality of tiles comprises a plurality of samples, wherein the encoded video signal comprises encoded picture data encoding the plurality of pictures. The encoded video signal comprises an encoding of the plurality of pictures. The encoded video signal comprises an encoding of hash information, wherein the hash information depends on a current portion of a current picture of the plurality of pictures, but does not depend on a succeeding portion of the current picture, wherein the current portion has a first location within the current picture, and the succeeding portion has a second location within the picture being different from the first location.

Moreover, A system comprising the above-described video encoder and the above-described video decoder according to an embodiment is provided. The video encoder is configured to generate the encoded video signal. The video decoder is configured to decode the encoded video signal to reconstruct the picture of the video.

BRIEF DESCRIPTION OF THE DRAWINGS

Embodiments of the present invention will be detailed subsequently referring to the appended drawings, in which.

DETAILED DESCRIPTION OF THE INVENTION

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 9 to FIG. 11. Thereinafter the description of embodiments of the concept of the present invention is presented along with a description as to how such concepts could be built into the encoder and decoder of FIG. 9 and FIG. 10, respectively, although the embodiments described with FIG. 1 to FIG. 3 and following, may also be used to form encoders and decoders not operating according to the coding framework underlying the encoder and decoder of FIG. 9 and FIG. 10.

Figure 9:
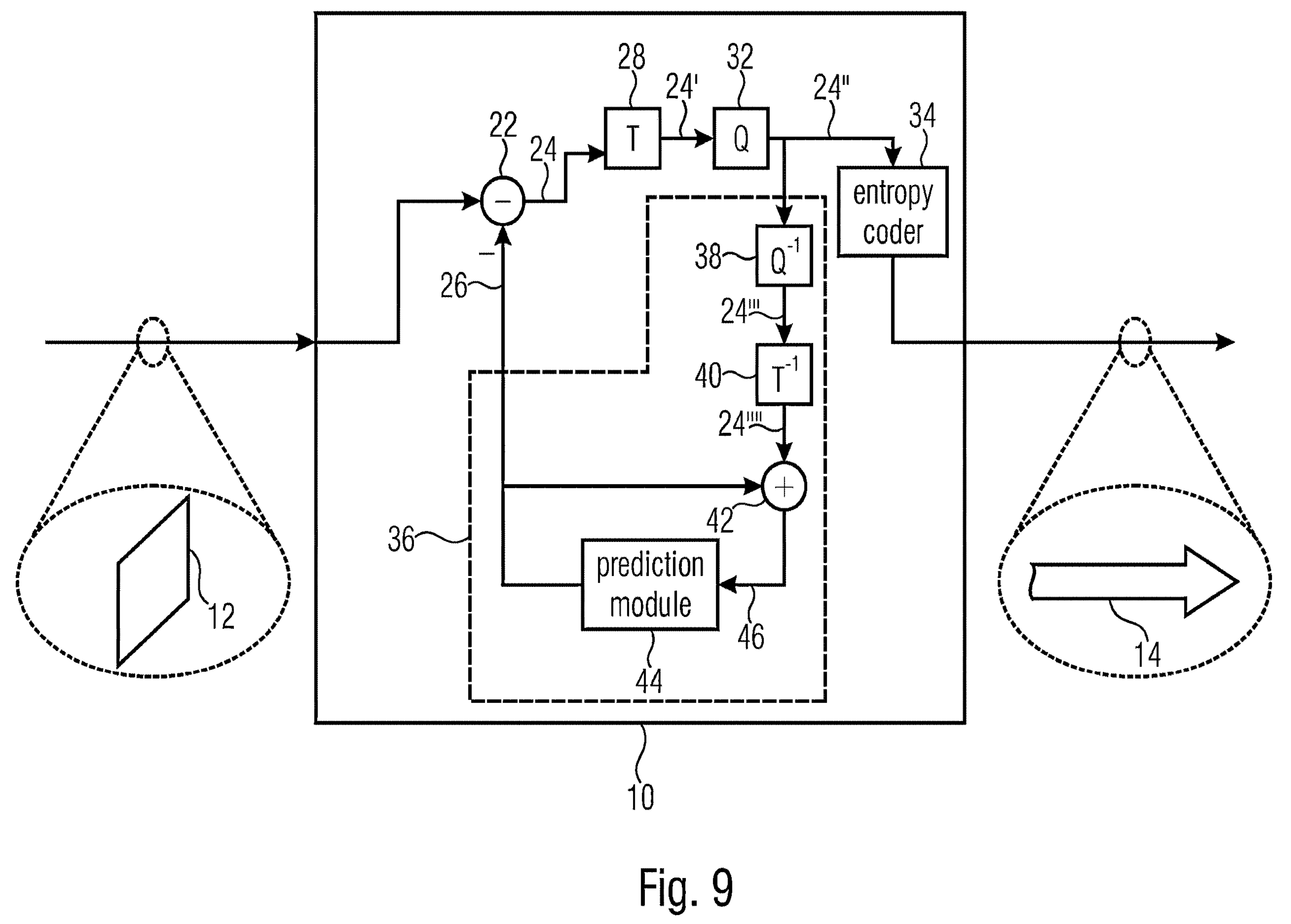
FIG. 9 illustrates a video encoder.
Figure 10:
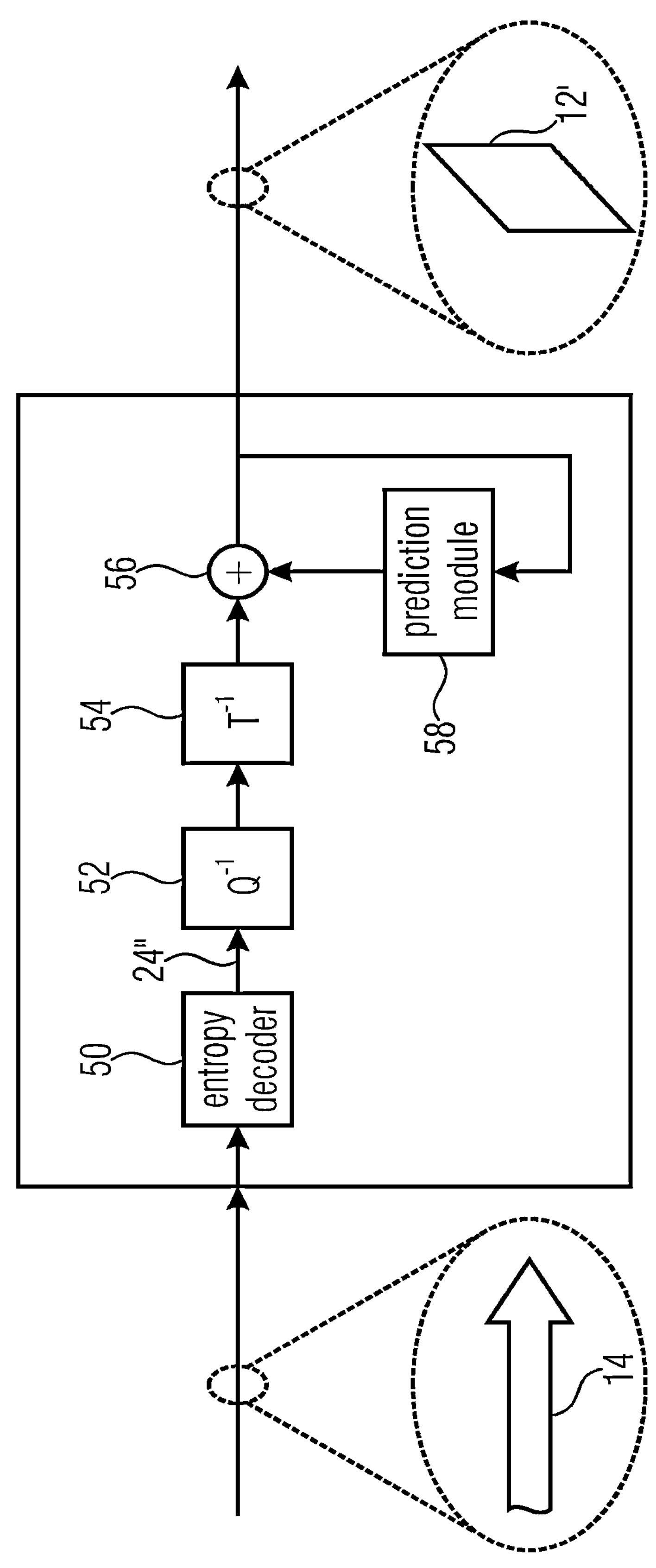
FIG. 10 illustrates a video decoder.

FIG. 9 shows a video encoder, an apparatus for predictively coding a picture 12 into a data stream 14 exemplarily using transform-based residual coding. The apparatus, or encoder, is indicated using reference sign 10. FIG. 10 shows a corresponding video decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 9 and FIG. 10 exemplarily use transform based prediction residual coding, although embodiments of the present application are not restricted to this kind of prediction residual coding. This is true for other details described with respect to FIG. 9 and FIG. 10, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24'' is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24'' encoded into, and decodable from, data stream 14. To this end, the prediction stage 36 may internally, as is shown in FIG. 9, comprise a dequantizer 38 which dequantizes prediction residual signal 24'' so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 10, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 10, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 11:
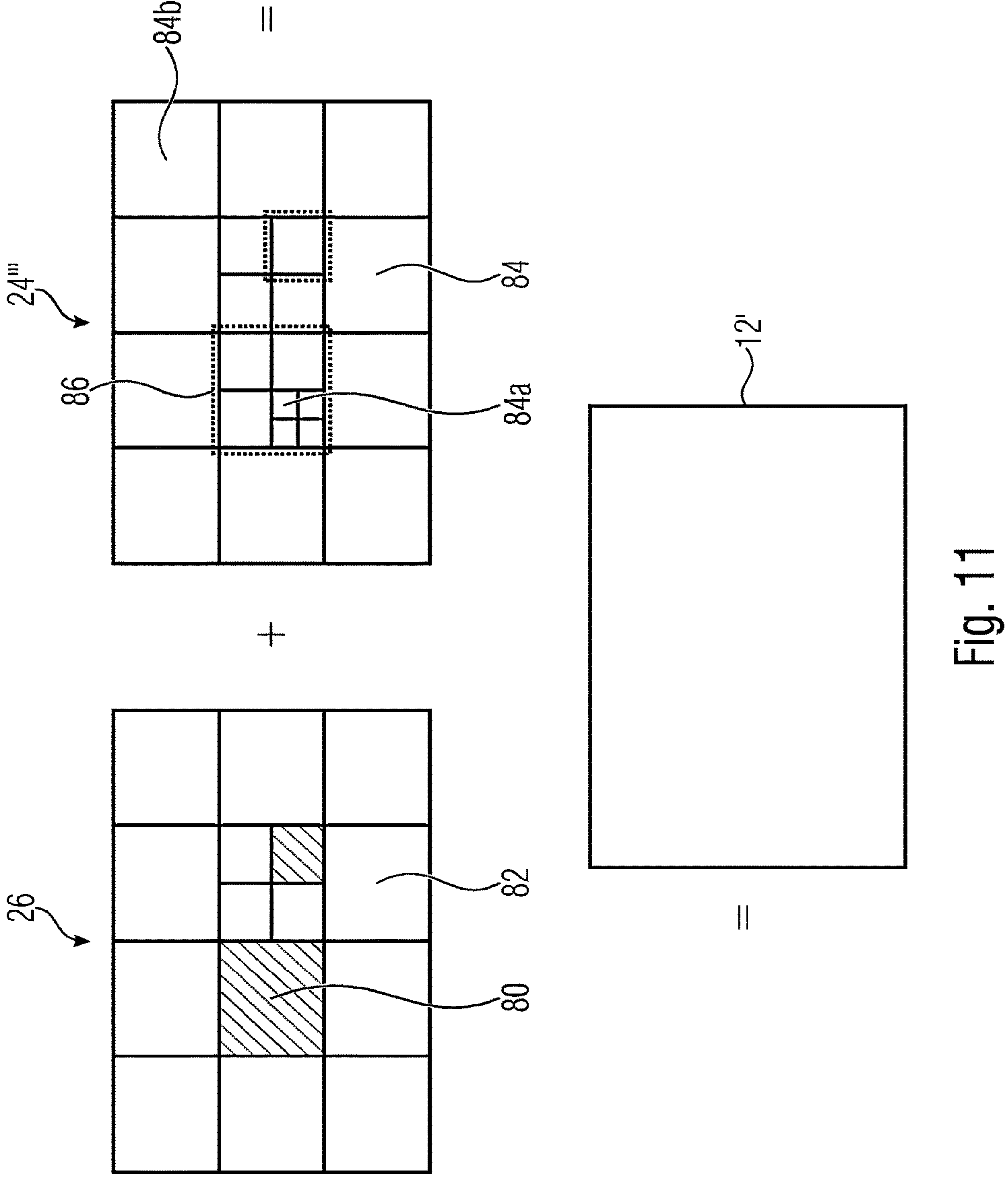
FIG. 11 illustrates the relationship between the reconstructed signal, i.e. the reconstructed picture, on the one hand, and the combination of the prediction residual signal as signaled in the data stream, and the prediction signal, on the other hand.

FIG. 11 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 11 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 11 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 11 is also illustrated as a subdivision of the picture area into blocks 84. These blocks might be called transform blocks in order to distinguish same from the coding blocks 80 and 82. In effect, FIG. 11 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 11 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 11 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 11, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 9 to FIG. 11 have been presented as an example where the inventive concept described further below may be implemented in order to form specific examples for encoders and decoders according to the present application. Insofar, the encoder and decoder of FIG. 9 and FIG. 10, respectively, may represent possible implementations of the encoders and decoders described herein below. FIG. 9 and FIG. 10 are, however, only examples. An encoder according to embodiments of the present application may, however, perform block-based encoding of a picture 12 using the concept outlined in more detail below and being different from the encoder of FIG. 9 such as, for instance, in that same is no video encoder, but a still picture encoder, in that same does not support inter-prediction, or in that the sub-division into blocks 80 is performed in a manner different than exemplified in FIG. 11. Likewise, decoders according to embodiments of the present application may perform block-based decoding of picture 12' from data stream 14 using the coding concept further outlined below, but may differ, for instance, from the decoder 20 of FIG. 10 in that same is no video decoder, but a still picture decoder, in that same does not support intra-prediction, or in that same sub-divides picture 12' into blocks in a manner different than described with respect to FIG. 11 and/or in that same does not derive the prediction residual from the data stream 14 in transform domain, but in spatial domain, for instance.

In the following, a generic video encoder according to embodiments is described in FIG. 1, a generic video decoder according to embodiments is described in FIG. 2, and a generic system according to embodiments is described in FIG. 3.

Figure 1:
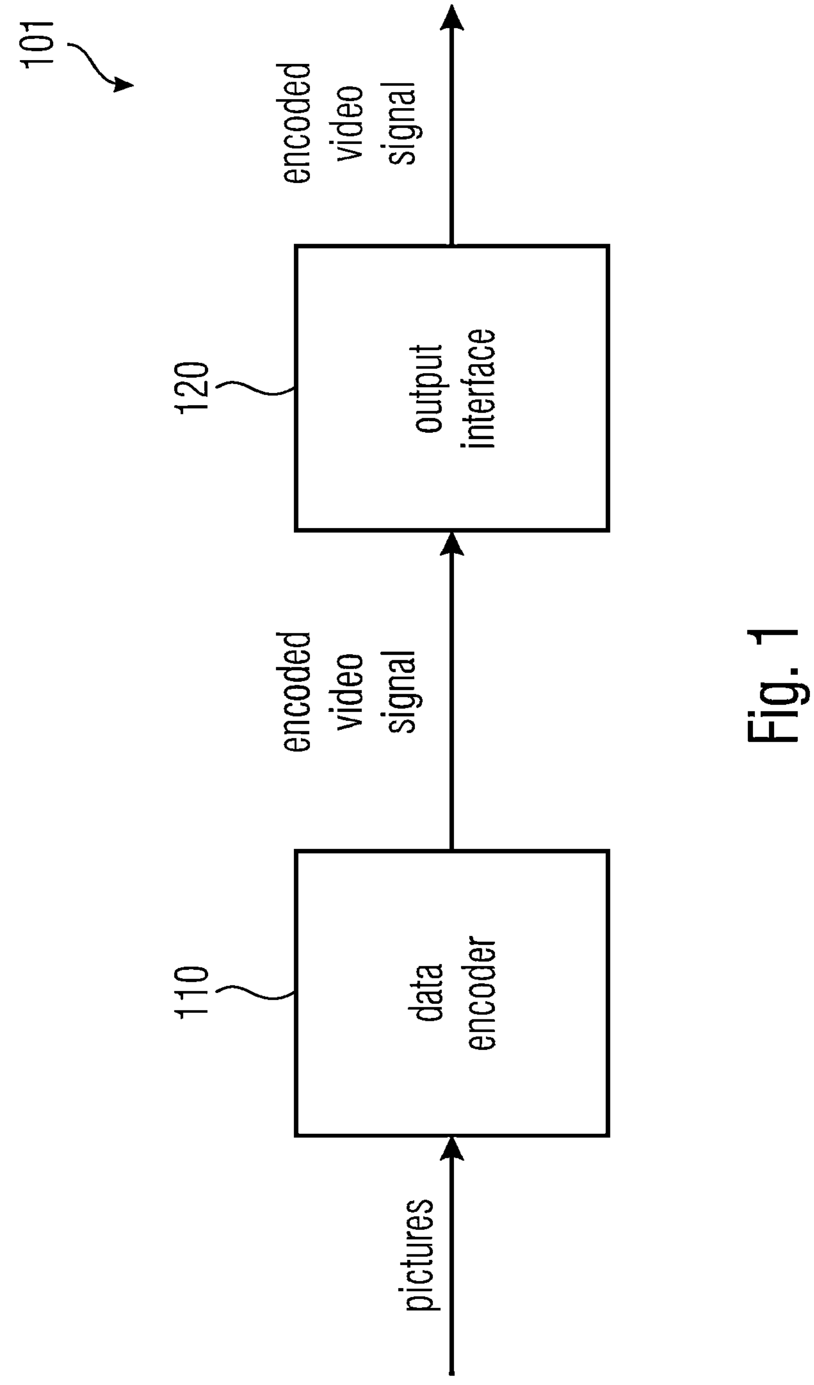
FIG. 1 illustrates a video encoder according to an embodiment.

FIG. 1 illustrates a generic video encoder 101 according to embodiments.

The video encoder 101 is configured for encoding a plurality of pictures of a video by generating an encoded video signal, wherein each of the plurality of pictures comprises original picture data.

The video encoder 101 comprises a data encoder 110 configured for generating the encoded video signal comprising encoded picture data, wherein the data encoder is configured to encode the plurality of pictures of the video into the encoded picture data.

Moreover, the video encoder 101 comprises an output interface 120 configured for outputting the encoded picture data of each of the plurality of pictures.

Figure 2:
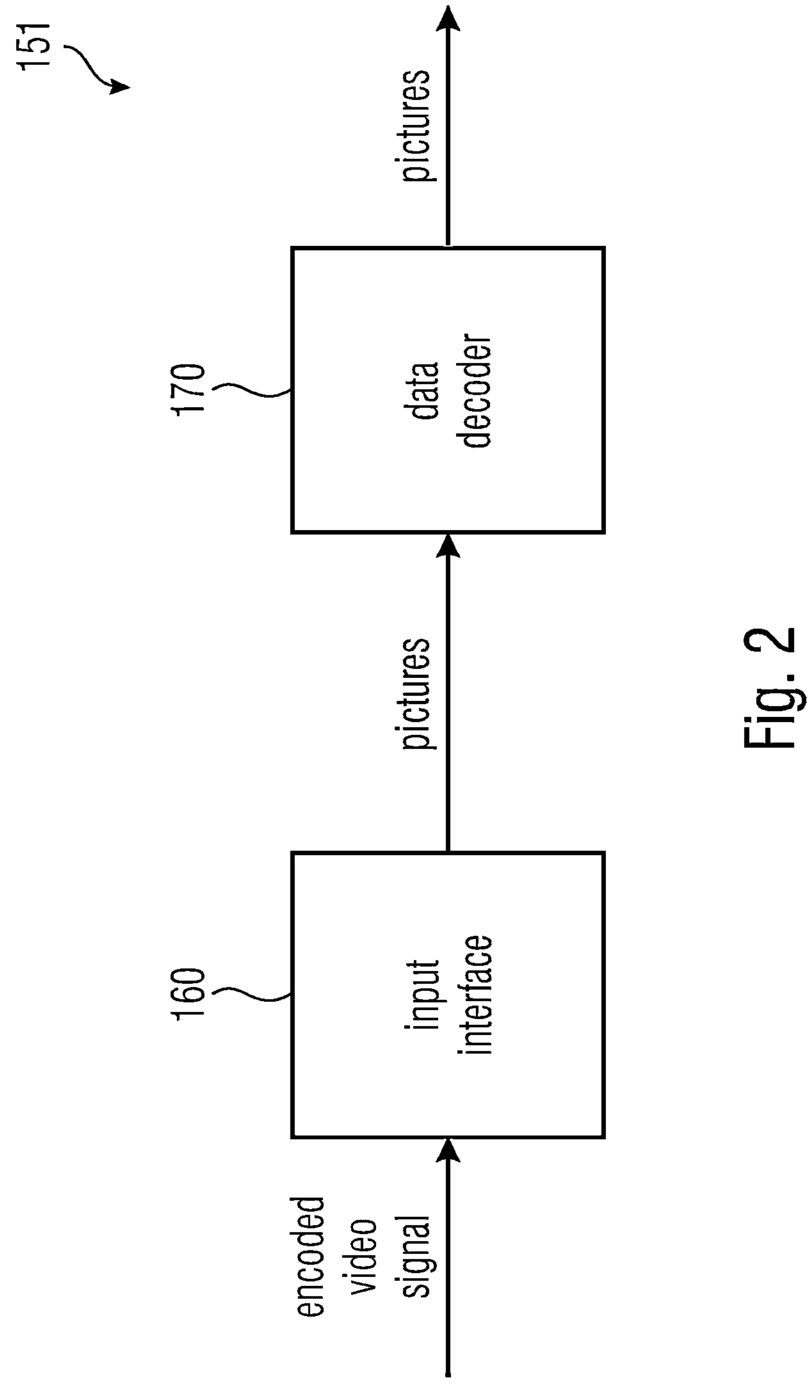
FIG. 2 illustrates a video decoder according to an embodiment.

FIG. 2 illustrates a generic video decoder 151 according to embodiments.

The video decoder 151 is configured for decoding an encoded video signal comprising encoded picture data to reconstruct a plurality of pictures of a video.

The video decoder 151 comprises an input interface 160 configured for receiving the encoded video signal.

Moreover, the video decoder comprises a data decoder 170 configured for reconstructing the plurality of pictures of the video by decoding the encoded picture data.

Figure 3:
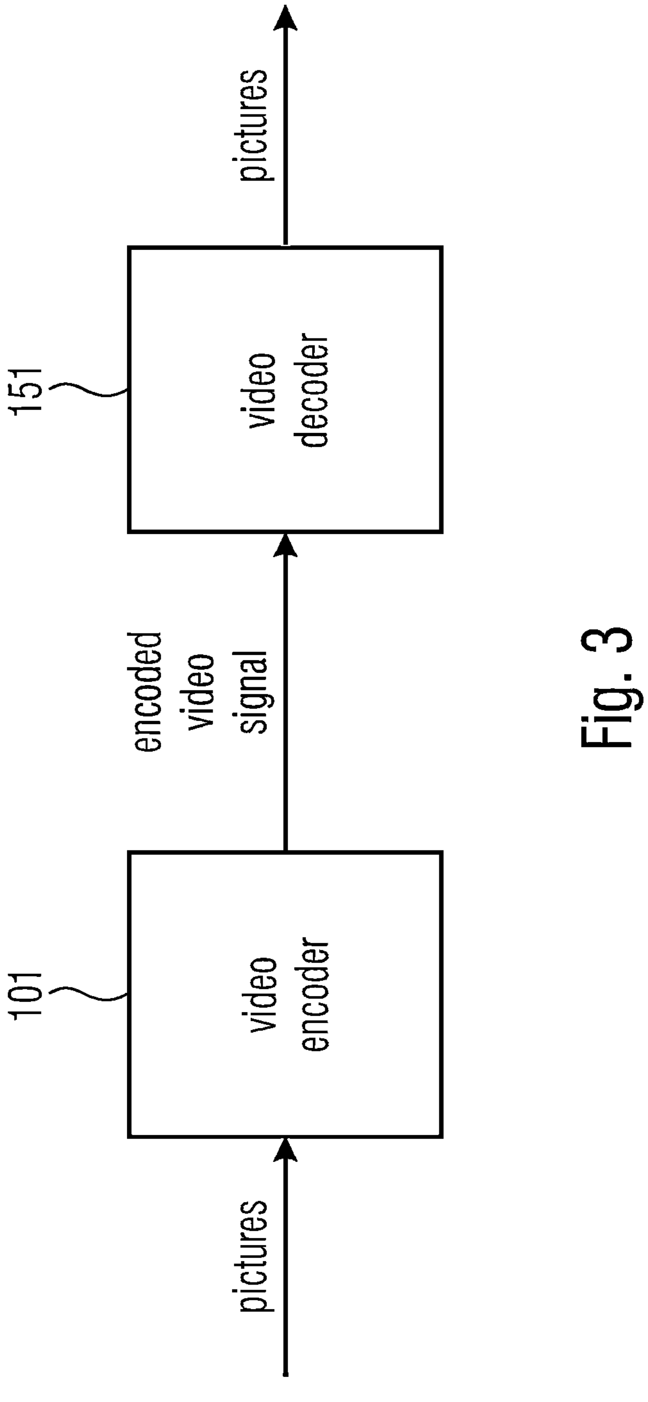
FIG. 3 illustrates a system according to an embodiment.

FIG. 3 illustrates a generic system according to embodiments.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

There exist video applications in which it is of benefit to divide a video into rectangular tiles/regions and encode them independently. For instance, in 360-degree video streaming, the current viewing orientation of the client is used to select the resolution of individual regions (high res in current viewport, low res outside current viewport as fallback for user orientation change). These tiles/regions are recombined into a single bitstream on client side and decoded jointly, whereby each tile potentially has different neighbor tiles that were not available or present during encoding.

Other examples can be RoI (RoI=Region of Interest) encodings, where there is for instance a region in the middle of the picture that viewers can select e.g. with a zoom in operation (decoding only the RoI), or gradual decoder refresh (GDR) in which intra data (that is typically put into one frame of a video sequence) is temporally distributed over several successive frames, e.g. as a column of intra blocks that swipes over the picture plane and resets the temporal prediction chain locally in the same fashion as an intra picture does it for the whole picture plane. For the latter, two regions exist in each picture, one that is recently reset and one that is potentially affected by errors and error propagation.

For these use cases and potentially others, it is vital that prediction dependencies across pictures from different time instants are restricted, so that (some) regions/tiles are coded independently. However, this leads to several problems which are addressed with the present invention. For one, conventional boundary filtering cannot be employed to lessen the subjective quality impact of dividing the picture plane into separate regions. Secondly, the state-of-the-art does not describe how certain boundary geometries are supposed to be filtered. Third, the picture hash signaling of standards such as HEVC does cannot be meaningfully used in above use cases as has value derivation incorporates the complete picture plane.

In the following, the first aspect of the invention is now described in detail.

In particular, the first aspect provides drift free filtering.

A video decoder 151 for decoding an encoded video signal comprising encoded picture data to reconstruct a plurality of pictures of a video according to an embodiment is provided. The video decoder 151 comprises an input interface 160 configured for receiving the encoded video signal, and a data decoder 170 configured for reconstructing the plurality of pictures of the video by decoding the encoded picture data. Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, the data decoder 170 is configured for filtering across a boundary between the first tile and the second tile to obtain a first filtered tile, wherein the first tile and the second tile have been independently encoded with respect to each other. The data decoder 170 is configured to decode a current tile of the plurality of tiles of a second picture of the plurality of pictures depending on a reference block of said first filtered tile of said first picture, wherein said reference block comprises a first group of samples of said first filtered tile, and wherein said reference block does not comprise a second group of samples of said first filtered tile, wherein none of said first group of samples has been affected by said filtering across said boundary between the first tile and the second tile, and wherein one or more of said second group of samples have been affected by said filtering across said boundary between the first tile and the second tile.

For example, in some embodiments, two tiles may, e.g., be considered to be neighboured, or may, e.g., be considered to be neighboured tiles, if they are located next to each other/neighboured in a picture of the plurality of pictures, or, if they are located neighboured if they are located next to each other/neighboured in a map after being mapped, e.g., by one or more mappings, according to a mapping rule into the map (for example, into a projection map, or, e.g., into a cube map, or, e.g., into an equirectangular map). E.g., the tiles may, for example, be mapped by employing region-wise packing. E.g., the tiles may, for example, be mapped by a first mapping into a projection map, and, e.g., by a second mapping from the projection map into an equirectangular map.

In an embodiment, the data decoder 170 may, e.g., be configured to not determine another reference block for decoding said current tile of said second picture, wherein said another reference block comprises one or more of said second group of samples of said first filtered tiles that have been affected by said filtering across said boundary between the first tile and the second tile.

According to an embodiment, the data decoder 170 may, e.g., be configured to determine said reference block such that said reference block comprises said first group of samples of said first filtered tile, and such that said reference block does not comprise said second group of samples of said first filtered tile, such that none of said first group of samples has been affected by said filtering across said boundary between the first tile and the second tile, and such that said one or more of said second group of samples have been affected by said filtering across said boundary between the first tile and the second tile.

In an embodiment, the data decoder 170 may, e.g., be configured to determine said reference block depending on a reach of a filter or a filter kernel, wherein the data decoder 170 may, e.g., be configured for employing said filter or said filter kernel for the filtering across said boundary between the first tile and the second tile.

According to an embodiment, the data decoder 170 may, e.g., be configured to determine said reference block depending on filter information on the reach of the filter or on the filter kernel. The filter information comprises a horizontal filter kernel reach that indicates how many of the plurality of samples of said first tile within one horizontal row of said first tile are affected by one or more of the plurality of samples of said second tile by the filtering across said boundary between the first tile and the second tile, wherein the data decoder 170 may, e.g., be configured to determine said reference block depending on said horizontal filter kernel reach. And/or: The filter information comprises a vertical filter kernel reach that indicates how many of the plurality of samples of said first tile within one vertical column of said first tile are affected by one or more of the plurality of samples of said second tile by the filtering across said boundary between the first tile and the second tile, wherein the data decoder 170 may, e.g., be configured to determine said reference block depending on said vertical filter kernel reach.

According to an embodiment, the data decoder 170 may, e.g., be configured to determine said reference block depending on said vertical filter kernel reach by extrapolating samples of said first group of samples. And/or the data decoder 170 may, e.g., be configured to determine said reference block depending on said horizontal filter kernel reach by extrapolating samples of said first group of samples.

In an embodiment, the data decoder 170 may, e.g., be configured to determine said reference block depending on said vertical filter kernel reach by employing a vertical clipping using said first group of samples, and/or the data decoder 170 may, e.g., be configured to determine said reference block depending on said horizontal filter kernel reach by employing a horizontal clipping using said first group of samples.

According to an embodiment, the vertical clipping may, e.g., be defined according to:

$$yInt_i = Clip3(topTileBoundaryPosition + verticalFilterKernelReachInSamples, bottomTileBoundaryPosition - 1 - verticalFilterKernelReachInSamples, yInt_L + i - 3)$$

$yInt_L$ indicates one of the plurality of samples of said first tile located at a position L in a vertical column of said first tile before the vertical clipping, $yInt_i$ indicates one of the plurality of samples of said first tile located at a position i in a vertical column of said first tile after the vertical clipping, verticalFilterKernelReachInSamples indicates a number of samples that indicates said vertical filter kernel reach, topTileBoundaryPosition indicates a topmost position of the plurality of samples within said vertical column of said first tile, bottomTileBoundaryPosition indicates a bottommost position of the plurality of samples within said vertical column of said first tile, wherein the horizontal clipping may, e.g., be defined according to:

$$xInt_i = Clip3(leftTileBoundaryPosition + horizontalFilterKernelReachInSamples, rightTileBoundaryPosition - 1 - horizontalFilterKernelReachInSamples, xInt_L + i - 3)$$

$xInt_L$ indicates one of the plurality of samples of said first tile located at a position L in a horizontal row of said first tile before the horizontal clipping, $xInt_i$ indicates one of the plurality of samples of said first tile located at a position i in a horizontal row of said first tile after the horizontal clipping, horizontalFilterKernelReachInSamples indicates a number of samples that indicates said horizontal filter kernel reach, leftTileBoundaryPosition indicates a leftmost position of the plurality of samples within said horizontal row of said first tile, rightTileBoundaryPosition indicates a rightmost position of the plurality of samples within said horizontal row of said first tile, wherein Clip3 is defined as:

$$Clip3(x, y, z) = \begin{cases} x; & z < x \\ y; & z > y \\ z; & \text{otherwise} \end{cases}.$$

According to an embodiment, the data decoder 170 may, e.g., be configured to determine said reference block depending on said horizontal filter kernel reach by employing said horizontal clipping and depending on said vertical filter kernel reach by employing said vertical clipping, wherein $$verticalFilterKernelReachInSamples = horizontalFilterKernelReachInSamples.$$

In an embodiment, the data decoder 170 may, e.g., be configured to determine said reference block depending on said horizontal filter kernel reach by employing said horizontal clipping and depending on said vertical filter kernel reach by employing said vertical clipping, wherein $$verticalFilterKernelReachInSamples \neq horizontalFilterKernelReachInSamples.$$

According to an embodiment, the data decoder 170 may, e.g., be configured to filter the first tile using said filter or said filter kernel, wherein the data decoder 170 may, e.g., be configured to modify said reach of said filter or of said filter kernel depending on a distance between a block to be filtered by said filter or said filter kernel of the first tile and said boundary between said first tile and said second tile.

In an embodiment, the data decoder 170 may, e.g., be configured to set said reach of said filter or of said filter kernel to a first size value, if said distance has a first distance value being smaller than or equal to a threshold distance. The data decoder 170 may, e.g., be configured to set said reach of said filter or of said filter kernel to a second size value being greater than the first size value, if said distance has a second distance value being greater than said first distance value and if said block and a neighboured block of said block belong to a same reference picture. The data decoder 170 may, e.g., be configured to set said reach of said filter or of said filter kernel to said first size value, if said distance has said second distance value being greater than said first distance value and if said block and said neighboured block of said block do not belong to said same reference picture.

Moreover, a video encoder 101 for encoding a plurality of pictures of a video by generating an encoded video signal according to an embodiment is provided. Each of the plurality of pictures comprises original picture data. The video encoder 101 comprises a data encoder 110 configured for generating the encoded video signal comprising encoded picture data, wherein the data encoder 110 is configured to encode the plurality of pictures of the video into the encoded picture data, and an output interface 120 configured for outputting the encoded picture data of each of the plurality of pictures. Each of the plurality of pictures comprises a plurality of tiles, wherein each of said plurality of tiles comprises a plurality of samples. For a first tile and a second tile of two neighboured tiles of the plurality of tiles of a first picture of the plurality of pictures, a boundary exists between the first tile and the second tile. The data encoder 110 is configured to independently encode the first tile and the second tile with respect to each other. Moreover, the data encoder 110 is configured to encode a current tile of the plurality of tiles of a second picture of the plurality of pictures depending on a reference block of said first tile of said first picture, wherein a filter defines a filtering across said boundary between the first tile and the second tile, wherein said reference block comprises a first group of samples of said first tile, and wherein said reference block does not comprise a second group of samples of said first tile, wherein none of said first group of samples would be affected by said filtering using said filter, and wherein one or more of said second group of samples would be affected by said filtering using said filter.

For example, in some embodiments, two tiles may, e.g., be considered to be neighboured, or may, e.g., be considered to be neighboured tiles, if they are located next to each other/neighboured in a picture of the plurality of pictures, or, if they are located neighboured if they are supposed to be mapped on a decoder side such that they are located next to each other/neighboured in a map after being mapped on the decoder side, e.g., by one or more mappings, according to a mapping rule into the map (for example, into a projection map, or, e.g., into a cube map, or, e.g., into an equirectangular map). E.g., the tiles may, for example, be mapped by employing region-wise packing. E.g., the tiles may, for example, be mapped by a first mapping into a projection map, and, e.g., by a second mapping from the projection map into an equirectangular map.

In an embodiment, the data encoder 110 may, e.g., be configured to not encode said current tile depending on another reference block which comprises one or more of said second group of samples of said first filtered tiles that have been affected by said filtering across said boundary between the first tile and the second tile.

According to an embodiment, the data encoder 110 may, e.g., be configured to determine said reference block, such that said reference block comprises said first group of samples of said first tile, and such that said reference block does not comprise said second group of samples of said first tile, such that none of said first group of samples would be affected by said filtering using said filter, and such that said one or more of said second group of samples would be affected by said filtering using said filter.

In an embodiment, the data encoder 110 may, e.g., be configured to determine said reference block depending on a reach of a filter or a filter kernel, wherein the data encoder 110 may, e.g., be configured for employing said filter or said filter kernel for the filtering across said boundary between the first tile and the second tile.

According to an embodiment, the data encoder 110 may, e.g., be configured to determine said reference block depending on filter information on the reach of the filter or on the filter kernel. The filter information comprises a horizontal filter kernel reach that indicates how many of the plurality of samples of said first tile within one horizontal row of said first tile are affected by one or more of the plurality of samples of said second tile by the filtering across said boundary between the first tile and the second tile, wherein the data encoder 110 may, e.g., be configured to determine said reference block depending on said horizontal filter kernel reach. And/or the filter information comprises a vertical filter kernel reach that indicates how many of the plurality of samples of said first tile within one vertical column of said first tile are affected by one or more of the plurality of samples of said second tile by the filtering across said boundary between the first tile and the second tile, wherein the data encoder 110 may, e.g., be configured to determine said reference block depending on said vertical filter kernel reach.

According to an embodiment, the data encoder 110 may, e.g., be configured to determine said reference block depending on said vertical filter kernel reach by extrapolating samples of said first group of samples. And/or, the data encoder 110 may, e.g., be configured to determine said reference block depending on said horizontal filter kernel reach by extrapolating samples of said first group of samples.

In an embodiment, the data encoder 110 may, e.g., be configured to determine said reference block depending on said vertical filter kernel reach by employing a vertical clipping using said first group of samples. And/or the data encoder 110 may, e.g., be configured to determine said reference block depending on said horizontal filter kernel reach by employing a horizontal clipping using said first group of samples.

According to an embodiment, the vertical clipping may, e.g., be defined according to:

$$yInt_i = Clip3(topTileBoundaryPosition + verticalFilterKernelReachInSamples, bottomTileBoundaryPosition - 1 - verticalFilterKernelReachInSamples, yInt_L + i - 3)$$

$yInt_L$ indicates one of the plurality of samples of said first tile located at a position L in a vertical column of said first tile before the vertical clipping, $yInt_i$ indicates one of the plurality of samples of said first tile located at a position i in a vertical column of said first tile after the vertical clipping, verticalFilterKernelReachInSamples indicates a number of samples that indicates said vertical filter kernel reach, topTileBoundaryPosition indicates a topmost position of the plurality of samples within said vertical column of said first tile, bottomTileBoundaryPosition indicates a bottommost position of the plurality of samples within said vertical column of said first tile, wherein the horizontal clipping may, e.g., be defined according to:

$$xInt_i = Clip3(leftTileBoundaryPosition + horizontalFilterKernelReachInSamples, rightTileBoundaryPosition - 1 - horizontalFilterKernelReachInSamples, xInt_L + i - 3)$$

$xInt_L$ indicates one of the plurality of samples of said first tile located at a position L in a horizontal row of said first tile before the horizontal clipping, $xInt_i$ indicates one of the plurality of samples of said first tile located at a position i in a horizontal row of said first tile after the horizontal clipping, horizontalFilterKernelReachInSamples indicates a number of samples that indicates said horizontal filter kernel reach, leftTileBoundaryPosition indicates a leftmost position of the plurality of samples within said horizontal row of said first tile, right TileBoundaryPosition indicates a rightmost position of the plurality of samples within said horizontal row of said first tile, wherein Clip3 is defined as:

$$Clip3(x, y, z) = \begin{cases} x; & z < x \\ y; & z > y \\ z; & \text{otherwise} \end{cases}.$$

In an embodiment, the data encoder 110 may, e.g., be configured to determine said reference block depending on said horizontal filter kernel reach by employing said horizontal clipping and depending on said vertical filter kernel reach by employing said vertical clipping, wherein $$verticalFilterKernelReachInSamples = horizontalFilterKernelReachInSamples.$$

According to an embodiment, the data encoder 110 may, e.g., be configured to determine said reference block depending on said horizontal filter kernel reach by employing said horizontal clipping and depending on said vertical filter kernel reach by employing said vertical clipping, wherein $$verticalFilterKernelReachInSamples \neq horizontalFilterKernelReachInSamples.$$

In an embodiment, the data encoder 110 may, e.g., be configured to filter the first tile using said filter or said filter kernel. The data encoder 110 may, e.g., be configured to modify said reach of said filter or of said filter kernel depending on a distance between a block to be filtered by said filter or said filter kernel of the first tile and said boundary between said first tile and said second tile.

According to an embodiment, the data encoder 110 may, e.g., be configured to set said reach of said filter or of said filter kernel to a first size value, if said distance has a first distance value being smaller than or equal to a threshold distance. The data encoder 110 may, e.g., be configured to set said reach of said filter or of said filter kernel to a second size value being greater than the first size value, if said distance has a second distance value being greater than said first distance value and if said block and a neighboured block of said block belong to a same reference picture. Moreover, the data encoder 110 may, e.g., be configured to set said reach of said filter or of said filter kernel to said first size value, if said distance has said second distance value being greater than said first distance value and if said block and said neighboured block of said block do not belong to said same reference picture.

Furthermore, a system comprising the above-described video encoder 101 and the above-described video decoder 151 is provided. The video encoder 101 is configured to generate the encoded video signal. The video decoder 151 is configured to decode the encoded video signal to reconstruct the picture of the video.

Moreover, a video decoder 151 for decoding an encoded video signal comprising encoded picture data to reconstruct a plurality of pictures of a video according to an embodiment is provided. The video decoder 151 comprises an input interface 160 configured for receiving the encoded video signal, and a data decoder 170 configured for reconstructing the plurality of pictures of the video by decoding the encoded picture data. Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a picture of the plurality of pictures, a boundary between the first tile and the second tile exists. The first tile and the second tile have been independently encoded with respect to each other. The data decoder 170 is configured to filter the first tile using a filter or a filter kernel, wherein the data decoder 170 is configured to modify a reach of said filter or of said filter kernel depending on a distance between a block to be filtered by said filter or said filter kernel of the first tile and said boundary between said first tile and said second tile, said block being one of the plurality of blocks of the first tile.

According to an embodiment, the data decoder 170 may, e.g., be configured to set said reach of said filter or of said filter kernel to a first size value, if said distance has a first distance value being smaller than or equal to a threshold distance. Moreover, the data decoder 170 may, e.g., be configured to set said reach of said filter or of said filter kernel to a second size value being greater than the first size value, if said distance has a second distance value being greater than said first distance value and if said block and a neighboured block of said block belong to a same reference picture. Furthermore, the data decoder 170 may, e.g., be configured to set said reach of said filter or of said filter kernel to said first size value, if said distance has said second distance value being greater than said first distance value and if said block and said neighboured block of said block do not belong to said same reference picture.

According to an embodiment, the data decoder 170 may, e.g., comprise a deblocking filter. For said block to be filtered of the first tile, the data decoder 170 may, e.g., be configured to filter said first tile using the deblocking filter, if, from said block to be filtered of the first tile, a second block within the second tile being independently encoded from the first tile, is within a filter reach of the deblocking filter, and/or wherein, for said block to be filtered of the first tile, the data decoder (170) may, e.g., be configured to set a deblocking filter strength of the deblocking filter depending on if, from said block to be filtered of the first tile, said second block within the second tile being independently encoded from the first tile, is within the filter reach of the deblocking filter.

In an embodiment, the data decoder 170 may, e.g., comprise a sample adaptive offset filter, wherein the sample adaptive offset filter may, e.g., comprise an edge offset mode and a band offset mode. For said block to be filtered of the first tile, the data decoder 170 may, e.g., be configured to activate the band offset mode and to filter said first tile using the sample adaptive offset filter, if, from said block to be filtered of the first tile, a third block within the second tile being independently encoded from the first tile, is within a filter reach of the sample adaptive offset filter in the edge offset mode.

According to an embodiment, the data decoder 170 may, e.g., comprise an adaptive loop filter. For said block to be filtered of the first tile, the data decoder 170 may, e.g., be configured to deactivate the adaptive loop filter, if, from said block to be filtered of the first tile, a fourth block within the second tile being independently encoded from the first tile, is within a filter reach of the adaptive loop filter.

Furthermore, a video encoder 101 for encoding a plurality of pictures of a video by generating an encoded video signal according to an embodiment is provided. Each of the plurality of pictures comprises original picture data. The video encoder 101 comprises a data encoder 110 configured for generating the encoded video signal comprising encoded picture data, wherein the data encoder 110 is configured to encode the plurality of pictures of the video into the encoded picture data, and an output interface 120 configured for outputting the encoded picture data of each of the plurality of pictures. Each of the plurality of pictures comprises a plurality of tiles, wherein each of said plurality of tiles comprises a plurality of blocks, wherein each of the plurality of blocks comprises a plurality of samples. For a first tile and a second tile of two neighboured tiles of the plurality of tiles of a first picture of the plurality of pictures, a boundary exists between the first tile and the second tile. The data encoder 110 is configured to independently encode the first tile and the second tile with respect to each other. Moreover, the data encoder 110 is configured to filter the first tile using a filter or a filter kernel, wherein the data encoder 110 is configured to modify a reach of said filter or of said filter kernel depending on a distance between a block to be filtered by said filter or said filter kernel and a boundary between said first tile and said second tile, said block being one of the plurality of blocks of the first tile.

In an embodiment, the data encoder 110 may, e.g., be configured to set said reach of said filter or of said filter kernel to a first size value, if said distance has a first distance value being smaller than or equal to a threshold distance. The data encoder 110 may, e.g., be configured to set said reach of said filter or of said filter kernel to a second size value being greater than the first size value, if said distance has a second distance value being greater than said first distance value and if said block and a neighboured block of said block belong to a same reference picture. Moreover, the data encoder 110 may, e.g., be configured to set said reach of said filter or of said filter kernel to said first size value, if said distance has said second distance value being greater than said first distance value and if said block and said neighboured block of said block do not belong to said same reference picture.

According to an embodiment, the data encoder 110 may, e.g., comprise a deblocking filter. For said block to be filtered of the first tile, the data encoder 110 may, e.g., be configured to filter said first tile using the deblocking filter, if, from said block to be filtered of the first tile, a second block within the second tile being independently encoded from the first tile, is within a filter reach of the deblocking filter, and/or wherein, for said block to be filtered of the first tile, the data decoder (170) may, e.g., be configured to set a deblocking filter strength of the deblocking filter depending on if, from said block to be filtered of the first tile, said second block within the second tile being independently encoded from the first tile, is within the filter reach of the deblocking filter.

In an embodiment, the data encoder 110 may, e.g., comprises a sample adaptive offset filter, wherein the sample adaptive offset filter may, e.g., comprise an edge offset mode and a band offset mode. For said block to be filtered of the first tile, the data encoder 110 may, e.g., be configured to activate the band offset mode and to filter said first tile using the sample adaptive offset filter, if, from said block to be filtered of the first tile, a third block within the second tile being independently encoded from the first tile, is within a filter reach of the sample adaptive offset filter in the edge offset mode.

According to an embodiment, the data encoder 110 may, e.g., comprise an adaptive loop filter. For said block to be filtered of the first tile, the data encoder 110 may, e.g., be configured to deactivate the adaptive loop filter, if, from said block to be filtered of the first tile, a fourth block within the second tile being independently encoded from the first tile, is within a filter reach of the adaptive loop filter.

Moreover, a system comprising the above-described video encoder 101 and the above-described video decoder 151 according to an embodiment is provided. The video encoder 101 is configured to generate the encoded video signal. The video decoder 151 is configured to decode the encoded video signal to reconstruct the picture of the video.

When regions of a picture are coded independently, e.g. as with tiles in HEVC, subjective artefacts are visible. That unwanted artefact is mitigated by allowing loop filtering across tile boundaries. This is not an issue when encoder and decoder can carry out the same procedure, however, when tiles need to be independently decodable and inter-changeable such as in the above use cases this approach is only possible if the content is encoded with MCTS and constraining the MVs to not point to any sample affected by the filtering process. Otherwise, if a region/tile border approach is used instead, such a feature is forbidden, as trivially allowing a loop filter across the tile boundaries would lead to wrong sample values being reconstructed due to "faulty" reference samples outside of the tiles (given by the loop filter kernel reach). In turn, using this contaminated samples, the motion compensated prediction would lead to further error propagation in the temporally following coded pictures. Especially, when contaminated samples are used for a boundary padding procedure as envisioned in VVC independent tiles, the affected area can grow in size rapidly (VVC=Versatile Video Coding).

In 360-degree video streaming, for instance with the MPEG OMAF standard (MPEG=Moving Picture Experts Group; OMAF=Omnidirectional Media Format), the specified approach to mitigate the above issue is overprovisioning each individual region in the coded picture with some spare picture samples that can be omitted or blended with spare picture samples of spatially neighboring regions. However, this approach negatively impacts the sample budget available for a given level decoder and is hence undesirable as decoded samples either are being thrown away or blended together after decoding.

An embodiment is directed to enabling a loop filter to cross boundaries of independent regions, but prevent motion compensated prediction to use sample values affected by the potentially impacted samples. One solution, similar to the encoder-side constraints used in HEVC, is to restrict motion compensation to obey the independent tile boundary plus inward pointing filter kernel reach so that no reference contains contaminated samples, i.e. the dashed line in the following FIG. 4*a*.

Figure 4A:
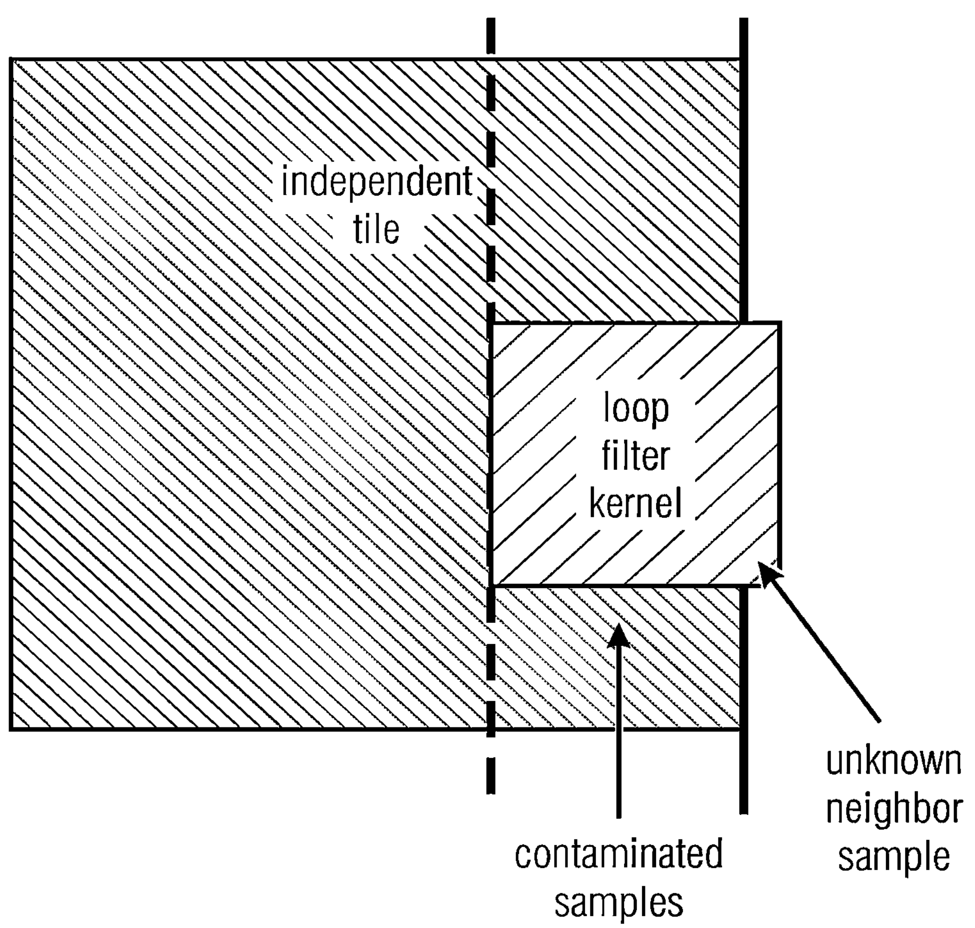
FIG. 4A illustrates contaminated samples inside a tile from loop filter procedure.

FIG. 4*a* illustrates contaminated samples inside a tile from loop filter procedure.

However, in VVC, another approach to enable motion-compensated prediction inside an independently coded tile is employed what can be characterized as a tile boundary extension. Herein, sample values at the tile boundary are extrapolated perpendicular to the tile boundary and motion estimation is allowed to reach into this boundary extension. Now when these tile boundary sample values are contaminated from a loop filter procedure, the error is propagated into the boundary extension and hence into following pictures as illustrated in FIG.

Figure 4B:
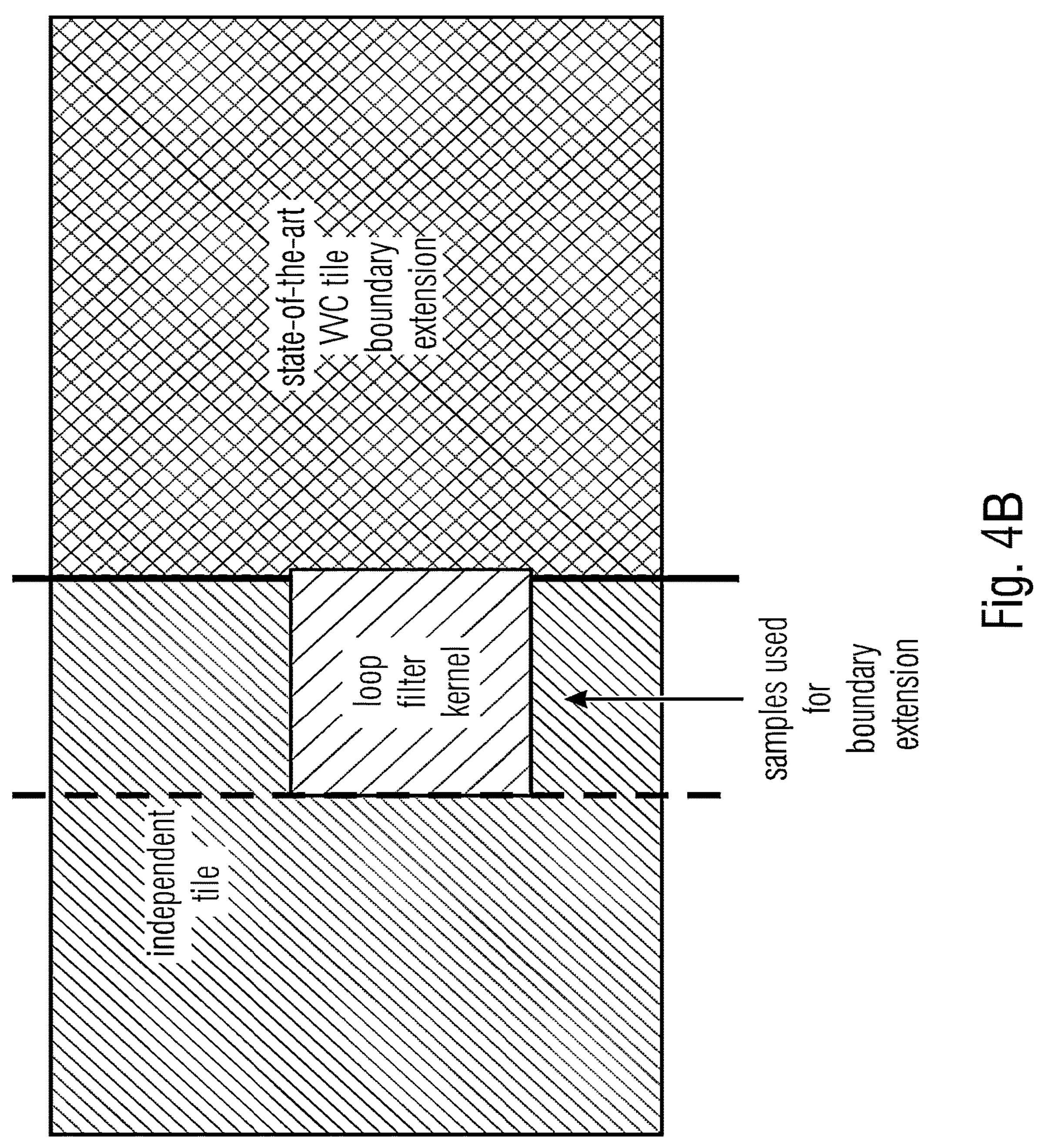
FIG. 4B illustrates VVC Tile Boundary Extension for independent region from contaminated samples.

FIG. 4*b* illustrates VVC Tile Boundary Extension for independent region from contaminated samples.

Therefore, an embodiment is directed to, instead of using the tile boundary sample, which is the last sample within the tile, or derivation of the boundary padding, using a closest sample within the tile that is not affected by the loop filter procedure for a perpendicular tile boundary extension, overwriting the also the sample values of contaminated samples within the tile as illustrated in the following FIG.

Figure 5:
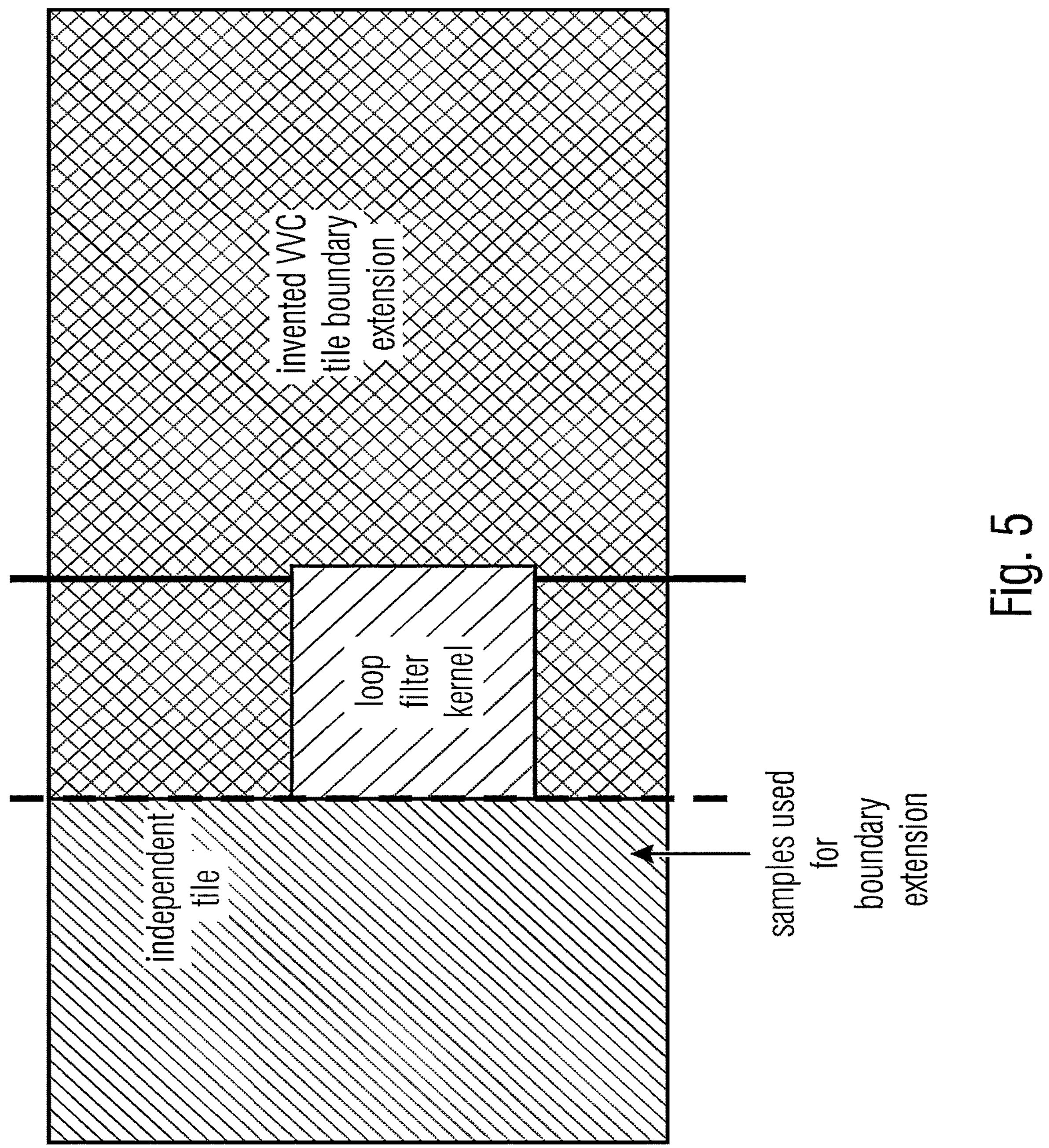
FIG. 5 illustrates a tile boundary extension procedure obeying the loop filter kernel reach according to an embodiment.

FIG. 5 illustrates a tile boundary extension procedure obeying the loop filter kernel reach according to an embodiment.

According to an embodiment, the state-of-the-art clipping that is used to generate the boundary padding samples in a reference block is adapted. Exemplary given are the equations for the horizontal and vertical component of a reference block sample position obeying the horizontal and vertical picture boundaries as in the current VVC draft 5 specification v3 (while at the same time omitting the motion vector wrap-around) as follows:

$$yInt_i = Clip3(0,\ picH-1,\ yInt_L+i-3)$$

$$xInt_i = Clip3(0,\ picW-1,\ xInt_L+i-3)$$

which would be altered according to an embodiment to include a further constant representative of the filter kernel reach as follows:

$$yInt_i = Clip3(topTileBoundaryPosition + verticalFilterKernelReachInSamples,\ bottomTileBoundaryPosition - 1 - verticalFilterKernelReachInSamples,\ yInt_L + i - 3)$$

$$xInt_i = Clip3(leftTileBoundaryPosition + horizontalFilterKernelReachInSamples,\ rightTileBoundaryPosition - 1 - horizontalFilterKernelReachInSamples,\ xInt_L + i - 3)$$

Clip3 is defined in [1] as:

$$Clip3(x, y, z) = \begin{cases} x; & z < x \\ y; & z > y \\ z; & \text{otherwise} \end{cases}$$

In an embodiment, verticalFilterKernelReachInSamples may, e.g., be equal to horizontalFilterKernelReachInSamples.

In another embodiment, verticalFilterKernelReachInSamples may, e.g., be different from horizontalFilterKernelReachInSamples.

It is important to note that tile boundary extensions are not part of the output picture which would still contain the contaminated samples.

Another embodiment is employed alternatively or additionally to the above concept. According to such an embodiment, the filterKernelReachInSamples (e.g., horizontalFilterKernelReachInSamples or verticalFilterKernelReachInSamples) of the filtering process is modified. Currently in VVC as for HEVC, either all in-loop filters are enabled across tiles or they are disabled. Still in order for the described region boundary extension to be more efficient, it would be desirable to limit the number of samples affected by the filtering process. E.g., the deblocking filter has 2 strengths depending usually on checks such as whether the same reference pictures are used for 2 neighboring blocks or not. According to the embodiment, blocks at region boundaries may, e.g., be typically derived as blocks for which the filter strength is such that a lower number of samples are affected at the process or that filter derivation process is independent/less dependent on the decoding context. Similarly, the reach of each of the other filters (SAO and ALF) could be modified at region boundaries (SAO=sample adaptive offset; ALF=adaptive loop filtering). Or filters could be disabled separately instead of all at once as done currently, e.g. only ALF is disabled.

According to an embodiment, deblocking filter strength may, e.g., be derived as follows: The strength may, e.g., be set to 1, if at least one of the two blocks at the block boundary belongs to a tile that is to be coded independently of the tile that the other block belongs to.

In an embodiment, for SAO, the band offset mode may, e.g., typically be used, not the edge offset mode, if the two block, located in different tiles being independently encoded from each other, are located on an independent tile boundary.

According to an embodiment, combinations of ALF, SAO, deblocking may, e.g., be disabled at independent tile boundaries.

In the following, the second aspect of an embodiment is now described in detail.

In particular, the second aspect provides motion compensated prediction on a concave tile group boundary (an inward pointing boundary of a concave tile group).

A video encoder 101 for encoding a plurality of pictures of a video by generating an encoded video signal according to an embodiment is provided. Each of the plurality of pictures comprises original picture data. The video encoder 101 comprises a data encoder 110 configured for generating the encoded video signal comprising encoded picture data, wherein the data encoder 110 is configured to encode the plurality of pictures of the video into the encoded picture data, and an output interface 120 configured for outputting the encoded picture data of each of the plurality of pictures. Each of the plurality of pictures comprises a plurality of tiles, wherein each of said plurality of tiles comprises a plurality of samples. The data encoder 110 is configured for determine an independently encoded tile group comprising three or more tiles of the plurality of tiles of a reference picture of the plurality of pictures. Moreover, the data encoder 110 is configured to encode the plurality of pictures depending on a reference block being located within the reference picture. Furthermore, the data encoder 110 is configured to select a location for said reference block within the reference picture such that the reference block is not both partially located within three tiles of the three or more tiles of said independently encoded tile group and also partially located within another tile of the plurality of tiles of the reference picture that does not belong to said independently encoded tile group.

In an embodiment, said three or more tiles may, e.g., be arranged in the reference picture such that they have an inward pointing boundary of a concave tile group with respect to the plurality of tiles of the reference picture that do not belong to the independently encoded tile group.

According to an embodiment, the data encoder 110 may, e.g., be configured to select a location for said reference block within the reference picture such that the reference block is not both partially located within a first tile of the three or more tiles of said independently encoded tile group and also partially located within a second tile of the plurality of tiles of the reference picture that does not belong to said independently encoded tile group.

Moreover, a system according to an embodiment comprising the above-described video encoder 101, and a video decoder 151 for decoding an encoded video signal comprising encoded picture data to reconstruct a plurality of pictures of a video is provided. The video decoder 151 comprises an input interface 160 configured for receiving the encoded video signal, and a data decoder 170 configured for reconstructing the plurality of pictures of the video by decoding the encoded picture data. The video encoder 101 is configured to generate the encoded video signal. The video decoder 151 is configured to decode the encoded video signal to reconstruct the picture of the video.

Furthermore, a video encoder 101 for encoding a plurality of pictures of a video by generating an encoded video signal according to an embodiment is provided. Each of the plurality of pictures comprises original picture data. The video encoder 101 comprises a data encoder 110 configured for generating the encoded video signal comprising encoded picture data, wherein the data encoder 110 is configured to encode the plurality of pictures of the video into the encoded picture data, and an output interface 120 configured for outputting the encoded picture data of each of the plurality of pictures. Each of the plurality of pictures comprises a plurality of tiles, wherein each of said plurality of tiles comprises a plurality of samples. The data encoder 110 is configured for determine an independently encoded tile group comprising three or more tiles of the plurality of tiles of a reference picture of the plurality of pictures. Moreover, the data encoder 110 is configured to encode the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Furthermore, the data encoder 110 is configured to determine a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

In an embodiment, said three or more tiles may, e.g., be arranged in the reference picture such that they have an inward pointing boundary of a concave tile group with respect to the plurality of tiles of the reference picture that do not belong to the independently encoded tile group.

According to an embodiment, the data encoder 110 may, e.g., be configured to determine the plurality of reference samples for a portion of said reference block, which is located within said another tile that does not belong to said independently encoded tile group, depending on a separation of said portion of said reference block that divides said portion into a first subportion and into a second subportion, such that those reference samples of the plurality of reference samples that are located in the first subportion are determined using said one or more samples of said first one of said three tiles but not using said one or more samples of said second one of said three tiles, and such that those reference samples of the plurality of reference samples that are located in the second subportion are determined using said one or more samples of said second one of said three tiles but not using said one or more samples of said first one of said three tiles.

In an embodiment, the separation of said portion of said reference block that divides said portion of said reference block, which is located within said another tile that does not belong to said independently encoded tile group, into a first subportion and into a second subportion, may, e.g., be a diagonal separation of said reference block.

According to an embodiment, the data encoder 110 may, e.g., be configured to determine the plurality of reference samples for a portion of said reference block, which is located within said another tile that does not belong to said independently encoded tile group, by employing planar intra prediction using said one or more samples of said first one of said three tiles of said independently encoded tile group and using said one or more samples of said second one of said three or tree tiles.

Moreover, a video decoder 151 for decoding an encoded video signal comprising encoded picture data to reconstruct a plurality of pictures of a video according to an embodiment is provided. The video decoder 151 comprises an input interface 160 configured for receiving the encoded video signal, and a data decoder 170 configured for reconstructing the plurality of pictures of the video by decoding the encoded picture data. Each of the plurality of pictures comprises a plurality of tiles, wherein each of said plurality of tiles comprises a plurality of samples. The encoded video signal comprises an independently encoded tile group comprising three or more tiles of the plurality of tiles of a reference picture of the plurality of pictures. The data decoder 170 is configured to decode the plurality of pictures depending on a reference block being located within the reference picture, wherein the reference block is partially located within three tiles of the three or more tiles of said independently encoded tile group and is partially located within another tile of the plurality of tiles of the reference picture that does not belong to said independently encoded tile group. Moreover, the data decoder 170 is configured to determine a plurality of reference samples for a portion of said reference block which is located within said another tile that does not belong to said independently encoded tile group depending on one or more of the plurality of samples of a first one of said three tiles of said independently encoded tile group and depending on one or more samples of the plurality of samples of a second one of said three tiles of said independently encoded tile group.

In an embodiment, said three or more tiles may, e.g., be arranged in the reference picture such that they have an inward pointing boundary of a concave tile group with respect to the plurality of tiles of the reference picture that do not belong to the independently encoded tile group.

According to an embodiment, the data decoder 170 may, e.g., be configured to determine the plurality of reference samples for a portion of said reference block, which is located within said another tile that does not belong to said independently encoded tile group, depending on a separation of said portion of said reference block that divides said portion into a first subportion and into a second subportion, such that those reference samples of the plurality of reference samples that are located in the first subportion are determined using said one or more samples of said first one of said three tiles but not using said one or more samples of said second one of said three tiles, and such that those reference samples of the plurality of reference samples that are located in the second subportion are determined using said one or more samples of said second one of said three tiles but not using said one or more samples of said first one of said three tiles.

In an embodiment, the separation of said portion of said reference block that divides said portion of said reference block, which is located within said another tile that does not belong to said independently encoded tile group, into a first subportion and into a second subportion, may, e.g., be a diagonal separation of said reference block.

According to an embodiment, the data decoder 170 may, e.g., be configured to determine the plurality of reference samples for a portion of said reference block, which is located within said another tile that does not belong to said independently encoded tile group, by employing planar intra prediction using said one or more samples of said first one of said three tiles of said independently encoded tile group and using said one or more samples of said second one of said three or tree tiles.

A system comprising the above-described video encoder 101 and the above-described video decoder 151. The video encoder 101 is configured to generate the encoded video signal. The video decoder 151 is configured to decode the encoded video signal to reconstruct the picture of the video.

When tile groups are formed in raster scan order, e.g. as specified in the VVC draft 5 specification v3, it can be that a boundary extension procedure is to be carried out on independently coded tile groups and needs to accommodate the tiling configuration in the following FIG.

Figure 6:
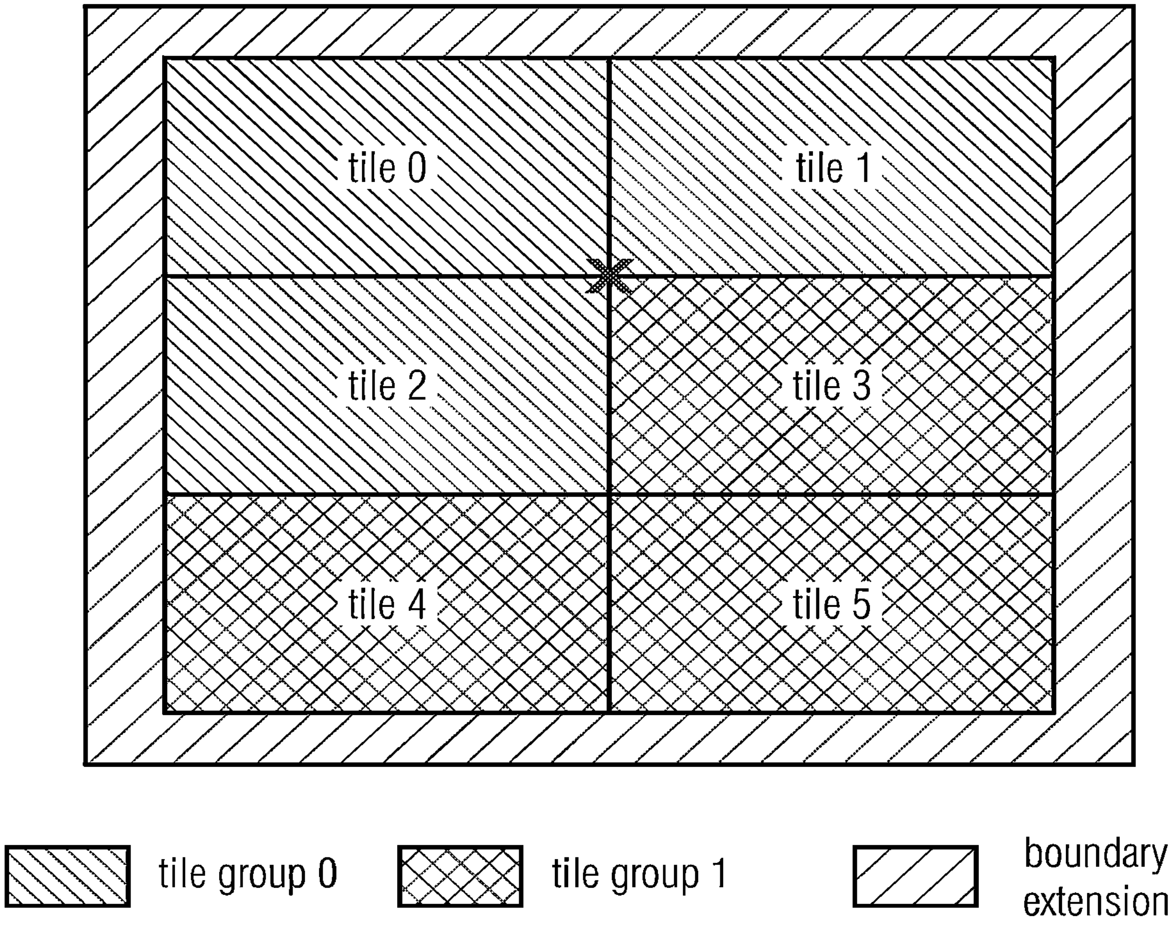
FIG. 6 illustrates tile and tile group divisioning of a coded picture.

FIG. 6 illustrates tile and tile group divisioning of a coded picture.

It can be seen from the picture that the state-of-the-art definition through clipping of sample positions, e.g. as defined in VVC draft 5 specification v3 is insufficient to cover tile boundaries such as marked with a red cross when processing tile group 0.

In the following, a closer look first what happens when the top and left boundaries of tile 0 of tile group 0 are involved in motion compensated prediction of a given reference block, i.e. at the convex top-left boundary of tile 0 in tile group 0 is provided. According to the state-of-the-art three regions outside tile 0 can be distinguished as illustrated in the following FIG. 7.

Figure 7:
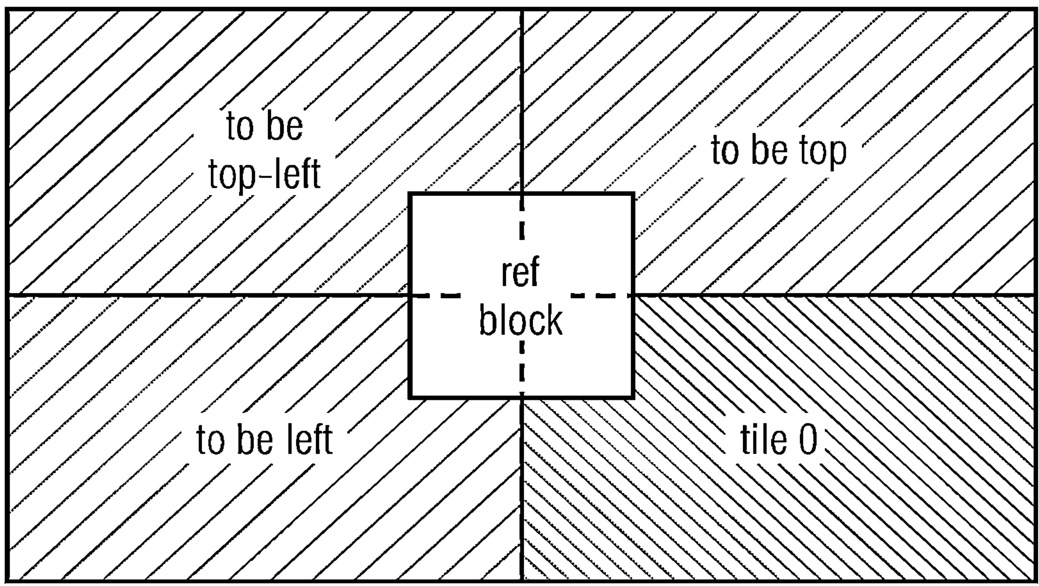
FIG. 7 illustrates a reference block with state-of-the-art boundary padding.

FIG. 7 illustrates a reference block with state-of-the-art boundary padding.

The portion of the ref block that lies within the region marked as TO BE Top is filled with a vertical extrapolation of the corresponding top sample row of tile 0, whereas the portion of the ref block that lies within the region marked as TO BE Left is filled with a horizontal extrapolation of the corresponding left sample column of tile 0. As for the portion of the ref block that lies within the region marked TO BE Top-Left, it is filled with a single sample value and that is the value of the sample at position 0,0 of tile 0, i.e. the top-left sample of tile 0.

Another example is shown in FIG, where boundary extension is to be applied for the L-shape region. In this case, for the bottom-right corner of tile 0, i.e. the concave boundary of tile group 0 illustrated in FIG, needs to be extrapolated for motion compensated prediction as well. However, the sample value extrapolation cannot trivially be done as for the convex tile group boundary similar to what is state-of-the-art at picture boundaries, as the perpendicular extrapolation of the tile boundaries in a concave tile group boundary yields two possible values per sample position in the boundary extension.

Therefore, an embodiment is directed to restricting the motion compensated prediction in the bitstream on encoder side and disallow reference blocks that contain samples from both tile 1 and tile 2 simultaneously, e.g. such as the 1$^{st}$ reference block indicated in FIG.

Figure 8:
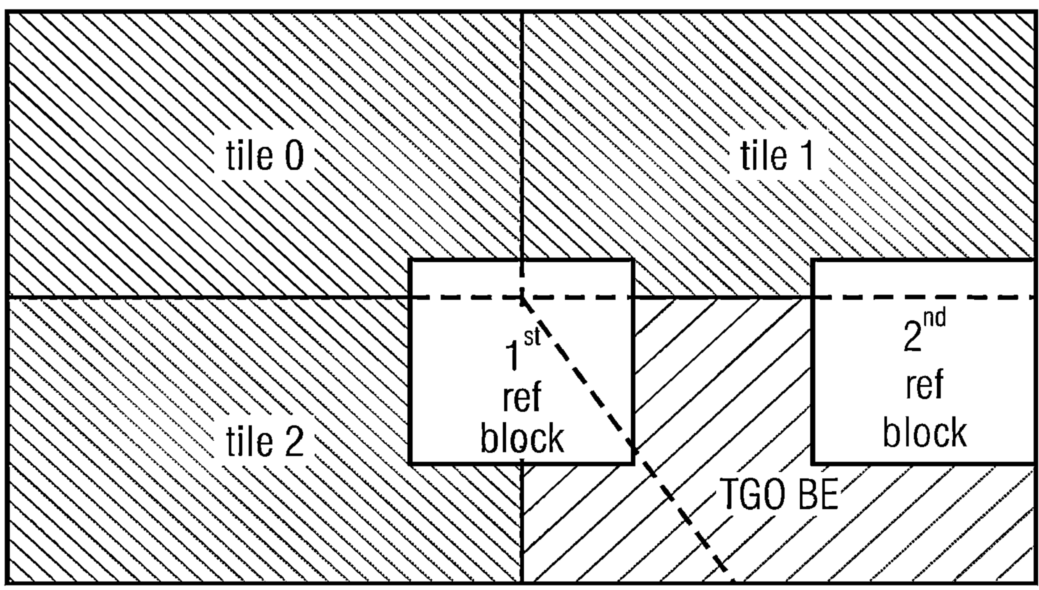
FIG. 8 illustrates diagonally splitted concave tile group boundary according to an embodiment.

FIG. 8 illustrates diagonally splitted concave tile group boundary according to an embodiment.

Reaching into the tile group 0 boundary extension area illustrated in FIG, is only allowed when samples of tile 1 or samples of tile 2 are inside the reference block exclusively, as illustrated with the 2$^{nd}$ reference block in FIG. In such cases, regular perpendicular boundary padding is applied with respect the boundary of the involved neighbor tiles, i.e. tile 1 in the example.

In an alternative to the above bitstream constraint, the solution is to divide the boundary padding area diagonally as illustrated through the dashed line in FIG, and fill the two parts of the boundary padding area separately by perpendicular extrapolation of the respective neighboring tile boundary sample values up to the diagonal border. In this alternative, a reference block containing samples from tile 1 and tile 2, i.e. the exemplary 1$^{st}$ reference block is also allowed. In a further alternative to the diagonal divide of the boundary padding area, the area as a whole is filled according to the planar intra prediction mode from the sample values of tile 1 and tile 2.

In a further alternative embodiment, it is useful that if such independent regions exist, the motion compensated prediction out of the region is restricted to not point outside that region unless it only crosses one boundary, i.e. $1^{st}$ reference block is disallowed and $2^{nd}$ reference block is disallowed.

In the following, the third aspect of the invention is now described in detail.

In particular, the third aspect provides a decoded picture hash for GDR.

A video encoder 101 for encoding a plurality of pictures of a video by generating an encoded video signal according to an embodiment is provided. Each of the plurality of pictures comprises original picture data. The video encoder 101 comprises a data encoder 110 configured for generating the encoded video signal comprising encoded picture data, wherein the data encoder 110 is configured to encode the plurality of pictures of the video into the encoded picture data, and an output interface 120 configured for outputting the encoded picture data of each of the plurality of pictures. The data encoder 110 is configured to encode hash information within the encoded video signal. Moreover, the data encoder 110 is configured to generate the hash information depending on a current portion of a current picture of the plurality of pictures, but not depending on a succeeding portion of the current picture, wherein the current portion has a first location within the current picture, and the succeeding portion has a second location within the picture being different from the first location.

According to an embodiment, the current picture comprises a plurality of portions, the current portion being one of the plurality of portions, the succeeding portion being another one of the plurality of portions, wherein each of said plurality of portions has a different location within the picture. The data encoder 110 may, e.g., be configured to encode said plurality of portions within the encoded video signal in a coding order, wherein the succeeding portion immediately succeeds the current portion in the coding order, or wherein the succeeding portion is interleaved with the current portion and partially succeeds the current portion in the coding order.

In an embodiment, the data encoder 110 may, e.g., be configured to encode said hash information that depends on said current portion.

According to an embodiment, the data encoder 110 may, e.g., be configured to generate said hash information, such that said hash information depends on said current portion, but not on any other portion of said plurality of portions of the current picture.

In an embodiment, the data encoder 110 may, e.g., be configured to generate said hash information, such that said hash information depends on said current portion and such that said hash information depends on one or more other portions of said plurality of portions which precede said current portion within the coding order, but such that said hash information does not depend on any other portion of said plurality of portions of the current picture which succeeds said current portion within the coding order.

According to an embodiment, the data encoder 110 may, e.g., be configured to generate said hash information, such that said hash information depends on said current portion and such that said hash information depends on said current portion of said current picture, and wherein said hash information depends on every other portion of said plurality of portions of said current picture, which precedes said current portion within the coding order, or which is interleaved with said current portion of said current picture and which partially precedes said current portion of said current picture within the coding order.

In an embodiment, the data encoder 110 may, e.g., be configured to encode the current picture of the plurality of pictures such that the encoded video signal may, e.g., be decodable by employing gradual decoding refresh.

For example, in an embodiment, the hash information may, e.g., depend on a refreshed region of said current picture being refreshed employing the gradual decoding refresh, but not on another region of said current picture which is not refreshed by the gradual decoding refresh.

According to an embodiment, the data encoder 110 may, e.g., be configured to generate the hash information such that the hash information indicates one or more hash values depending on said current portion of said current picture but not on said succeeding portion of said current picture.

In an embodiment, the data encoder 110 may, e.g., be configured to generate each of said one or more hash values depends on a plurality of luma samples of said current portion and/or depends on a plurality of chroma samples of said current portion.

According to an embodiment, the data encoder 110 may, e.g., be configured to generate each of said one or more hash values as an message-digest algorithm 5 value, or as a cyclic redundancy check value, or as a checksum, which depends on said plurality of luma samples of said current portion and/or depends on said plurality of chroma samples of said current portion.

A video decoder 151 for decoding an encoded video signal comprising encoded picture data to reconstruct a plurality of pictures of a video according to an embodiment is provided. The video decoder 151 comprises an input interface 160 configured for receiving the encoded video signal, and a data decoder 170 configured for reconstructing the plurality of pictures of the video by decoding the encoded picture data. The data decoder 170 is configured to analyse hash information encoded within the encoded video signal, wherein the hash information depends on a current portion of a current picture of the plurality of pictures, but does not depend on a succeeding portion of the current picture, wherein the current portion has a first location within the current picture, and the succeeding portion has a second location within the picture being different from the first location.

According to an embodiment, the current picture comprises a plurality of portions, the current portion being one of the plurality of portions, the succeeding portion being another one of the plurality of portions, wherein each of said plurality of portions has a different location within the picture, wherein said plurality of portions is encoded within the encoded video signal in a coding order, wherein the succeeding portion immediately succeeds the current portion in the coding order, or wherein the succeeding portion is interleaved with the current portion and partially succeeds the current portion in the coding order.

In an embodiment, said hash information that depends on said current portion may, e.g., be encoded.

According to an embodiment, said hash information depends on said current portion, but not on any other portion of said plurality of portions of the current picture.

In an embodiment, said hash information depends on said current portion and such that said hash information depends on one or more other portions of said plurality of portions which precede said current portion within the coding order, but such that said hash information does not depend on any other portion of said plurality of portions of the current picture which succeeds said current portion within the coding order.

According to an embodiment, said hash information depends on said current portion and wherein said hash information depends on said current portion of said current picture, and wherein said hash information depends on every other portion of said plurality of portions of said current picture, which precedes said current portion within the coding order, or which is interleaved with said current portion of said current picture and which partially precedes said current portion of said current picture within the coding order.

In an embodiment, the data decoder 170 may, e.g., be configured to decode encoded video signal to reconstruct the current picture employing gradual decoding refresh.

For example, in an embodiment, the hash information may, e.g., depend on a refreshed region of said current picture being refreshed employing the gradual decoding refresh, but not on another region of said current picture which is not refreshed by the gradual decoding refresh.

According to an embodiment, the hash information indicates one or more has values depending on said current portion of said current picture but not on said succeeding portion of said current picture.

In an embodiment, each of said one or more hash values depends on a plurality of luma samples of said current portion and/or depends on a plurality of chroma samples of said current portion.

According to an embodiment, each of said one or more hash values may, e.g., be a message-digest algorithm 5 value, or may, e.g., be a cyclic redundancy check value, or may, e.g., be a checksum, which depends on a plurality of luma samples of said current portion and/or depends on a plurality of chroma samples of said current portion.

Moreover, a system comprising the above-described video encoder 101 and the above-described video decoder 151 according to an embodiment is provided. The video encoder 101 is configured to generate the encoded video signal. The video decoder 151 is configured to decode the encoded video signal to reconstruct the picture of the video.

An important tool for implementors are control points carried in the coded video bitstream to verify correct operation of a decoder and bitstream integrity. For instance, there exist means to carry hashes such as MD5, CRC or simple checksums of the decoded sample values of a picture in SEI messages (SEI=supplemental enhancement information; MD 5=message-digest algorithm 5; CRC=cyclic redundancy check) associated with each picture. Thereby, it is possible to verify on decoder side whether the decoded output matches the encoder envisioned output without having access to the raw material or the encoder. A mismatch would either allow to identify issues in a decoder implementation (during development) but also to identify corruption of bitstreams (in a service) in case the decoder implementation is verified already. This could for instance be used for error detection in systems, e.g. in conversational scenarios using RTP based communication channels for which a client would have to actively request a prediction chain resetting IDR picture to resolve the decoding error caused by bitstream corruption.

In a GDR scenario however, the state-of-the-art SEI message mechanism is not sufficient to allow meaningful detection of integrity of decoder or bitstream. This is because in a GDR scenario, a picture can also be considered correctly decoded when only a part is reconstructed correctly, i.e. the area that had its temporal prediction chain recently refreshed through a sweeping intra column or row. Take, for instance, the random accessing of a stream that uses a GDR based encoding scheme. From the point on where the stream is decoded, a number of (partly) erroneous pictures will be decoded until the first entirely correct picture is decoded and can be displayed. Now, while a client is able to recognize the first entirely correct decoded picture from a matching state-of-the-art decoded picture hash SEI message, a client will not be able to check decoder or bitstream integrity in the decoded pictures leading up to the first entire correctly decoded picture. Hence, it could be that a corrupted bitstream or a decoder implementation fault leads to the issue of the client never reaching an entirely correct decoded picture. Hence, the point in time at which a client could take aversive measures (e.g. request the sender side to provide a different kind of random access to ensure bitstream integrity) would occur significantly later as with the present invention that allows per-picture detection of these circumstances. An example for such a disadvantageous state-of-the-art detection mechanism would be to wait for a pre-defined time threshold, e.g. multiple GDR periods (that are derivable from bitstream signaling) before recognizing the bitstream as corrupt or the like. Therefore, in a GDR scenario, it is vital to distinguish encoder/decoder mismatch depending on region.

An embodiment provides bitstream signaling of the decoded picture hash of a GDR refreshed region for the client to benefit from it as described above. In one embodiment, regions are defined in the SEI messages through luma sample positions in the coded picture and each region is provided with a corresponding hash.

In another embodiment, a single hash for the GDR refreshed region is provided in the bitstream through an SEI message for instance. The region associated with the hash in a particular access unit (i.e. picture) changes over time and corresponds to all blocks that have had their prediction chain reset from the sweeping intra column or row in the GDR period. I.e for the first picture in the GDR period, e.g. with a column of intra block on the left-hand side of the picture, the region contains only the intra blocks of that particular column, while for each successive picture, the region contains the column of intra blocks and all blocks on the left hand side from it, assuming a sweep of the intra refresh column from left to right, until the final picture of the GDR period contains no more un-refreshed blocks and the hash is derived using all blocks of the coded picture. The following gives an exemplary syntax and semantics of such a message.

Decoded GDR refreshed region hash SEI message syntax

| | Descriptor |
|---|---|
| decoded_gdr_refreshed_region_hash( payloadSize ) { | |
| hash_type | u(8) |
| for( cIdx = 0; cIdx < ( chroma_format_idc = = 0 ? 1 : 3 ); cIdx++ ) | |
| if( hash_type = = 0 ) | |
| for( i = 0; i < 16; i++) | |
| picture_md5 [ cIdx ][ i ] | b(8) |
| else if( hash_type = = 1 ) | |
| picture_crc[ cIdx ] | u(16) |
| else if( hash_type = = 2 ) | |
| picture_checksum[ cIdx ] | u(32) |
| } | |

This message provides a hash for the refreshed region of each colour component of the current decoded picture.

NOTE 1—The decoded GDR refreshed region hash SEI message is a suffix SEI message and cannot be contained in a scalable nesting SEI message.

Prior to computing the hash, the GDR refreshed region of the decoded picture data is arranged into one or three strings of bytes called pictureData[cIdx] of lengths dataLen[cIdx] by copying the respective sample values of each decoded picture component successivly into the string of bytes pictureData.

The syntax elements hash_type, picture_md5[cIdx][i], picture_crc[cIdx], picture_checksum[cIdx] are essentially equal to what is defined for the Decoded Picture Hash SEI message in HEVC, i.e. deriving a hash from the data in the pictureData arrays.

When the above concept is combined with the first aspect of the invention, i.e. a boundary extension mechanism that obeys the loop filter kernel reach, the region to be used for hash calculation also omits the samples potentially contaminated by the loop filter kernel reach.

In an embodiment, hash information can be send at the beginning or end of pictures.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC, ITU-T. High efficiency video coding. ITU-T Recommendation H.265|ISO/IEC 23008 10 (HEVC), edition 1, 2013; edition 2, 2014.

The invention claimed is:

1. A video decoder comprising at least one processor, the at least one processor configured to:

receive an encoded video signal, the encoded video signal including a supplemental enhancement information (SEI) message comprising hash information, the hash information comprising a first hash value for decoded sample values of a color component of a refreshed region of a gradual decoder refresh (GDR) picture;

decode the encoded video signal to obtain the decoded sample values of the color component of the refreshed region of the GDR picture;

determine a second hash value based on the decoded sample values of the color component of the refreshed region of the GDR picture; and determine whether the decoded sample values of the color component of the refreshed region of the GDR picture are correct by comparing the first hash value and the second hash value.

2. The video decoder of claim 1, wherein the hash information comprises a respective hash value for each color component of the refreshed region of the GDR picture.

3. The video decoder of claim 2, wherein the refreshed region of the GDR picture comprises a luma color component and two chroma color components.

4. A video encoder comprising at least one processor, the at least one processor configured to:

encode a gradual decoder refresh (GDR) picture into a data stream; and encode a supplemental enhancement information (SEI) message comprising hash information into the data stream, the hash information comprising a first hash value for decoded sample values of a color component of a refreshed region of a gradual decoder refresh (GDR) picture, wherein the hash information is configured for use by a decoder to verify the decoded sample values of the color component of the refreshed region of the GDR.

5. The video encoder of claim 4, wherein the hash information comprises a respective hash value for each color component of the refreshed region of the GDR picture.

6. The video encoder of claim 5, wherein the refreshed region of the GDR picture comprises a luma color component and two chroma color components.

7. A method of video decoding, the method comprising:

receiving an encoded video signal, the encoded video signal including a supplemental enhancement information (SEI) message comprising hash information, the hash information comprising a first hash value for decoded sample values of a color component of a refreshed region of a gradual decoder refresh (GDR) picture;

decoding the encoded video signal to obtain the decoded sample values of the color component of the refreshed region of the GDR picture;

determining a second hash value based on the decoded sample values of the color component of the refreshed region of the GDR picture; and determining whether the decoded sample values of the color component of the refreshed region of the GDR picture are correct by comparing the first hash value and the second hash value.

8. The method of claim 7, wherein the hash information comprises a respective hash value for each color component of the refreshed region of the GDR picture.

9. The method of claim 8, wherein the refreshed region of the GDR picture comprises a luma color component and two chroma color components.

10. A method of video encoding, the method comprising:

encoding a gradual decoder refresh (GDR) picture into a data stream; and encoding a supplemental enhancement information (SEI) message comprising hash information into the data stream, the hash information comprising a first hash value for decoded sample values of a color component of a refreshed region of a gradual decoder refresh (GDR) picture, wherein the hash information is configured for use by a decoder to verify the decoded sample values of the color component of the refreshed region of the GDR.

11. The method of claim 10 wherein the hash information comprises a respective hash value for each color component of the refreshed region of the GDR picture.

12. The method of claim 11, wherein the refreshed region of the GDR picture comprises a luma color component and two chroma color components.

* * * * *